United States Patent [19]

Okawa et al.

[11] Patent Number: 5,629,912
[45] Date of Patent: May 13, 1997

[54] FOCUSING SERVO CONTROLLING APPARATUS

[75] Inventors: Sumihiro Okawa; Takayasu Muto; Shuji Uehara, all of Kanagawa, Japan

[73] Assignee: Sony Corporation, Tokyo, Japan

[21] Appl. No.: 593,045

[22] Filed: Jan. 29, 1996

[30] Foreign Application Priority Data

Jan. 30, 1995 [JP] Japan .................................. 7-013204
Jan. 30, 1995 [JP] Japan .................................. 7-013209

[51] Int. Cl.[6] .................................................. G11B 7/095
[52] U.S. Cl. ............................ 369/44.29; 369/44.35; 369/44.34; 369/44.26
[58] Field of Search ........................... 369/44.29, 44.25, 369/44.34, 44.35, 44.36, 50, 44.27, 44.26, 44.28, 54, 44.13

[56] References Cited

U.S. PATENT DOCUMENTS

| | | | |
|---|---|---|---|
| 4,512,003 | 4/1985 | Kimura et al. | 369/44.13 |
| 4,907,212 | 3/1990 | Pharris et al. | 369/44.26 |
| 5,103,439 | 4/1992 | Bierhoff et al. | 369/44.29 |
| 5,146,442 | 9/1992 | Shikichi | 369/44.29 |
| 5,379,282 | 1/1995 | Wachi | 369/44.35 |
| 5,475,664 | 12/1995 | Shimizume et al. | 369/44.29 |

*Primary Examiner*—Thang V. Tran
*Attorney, Agent, or Firm*—Limbach & Limbach L.L.P.

[57] ABSTRACT

A magneto-optical disc recording or reproducing device focusing control servo system which uses a digital signal processor (DSP) to control a pulse width modulation (PWM) circuit so that if the focusing servo is to be in operation alone, such as during a focusing search or seek, fixed clocks of a fixed frequency are used for processing focusing servo signals and after engagement of the focusing servo, focusing servo is effected responsive to focusing servo signals which are formed based upon a reproduced servo pattern of the magneto-optical disc.

16 Claims, 19 Drawing Sheets

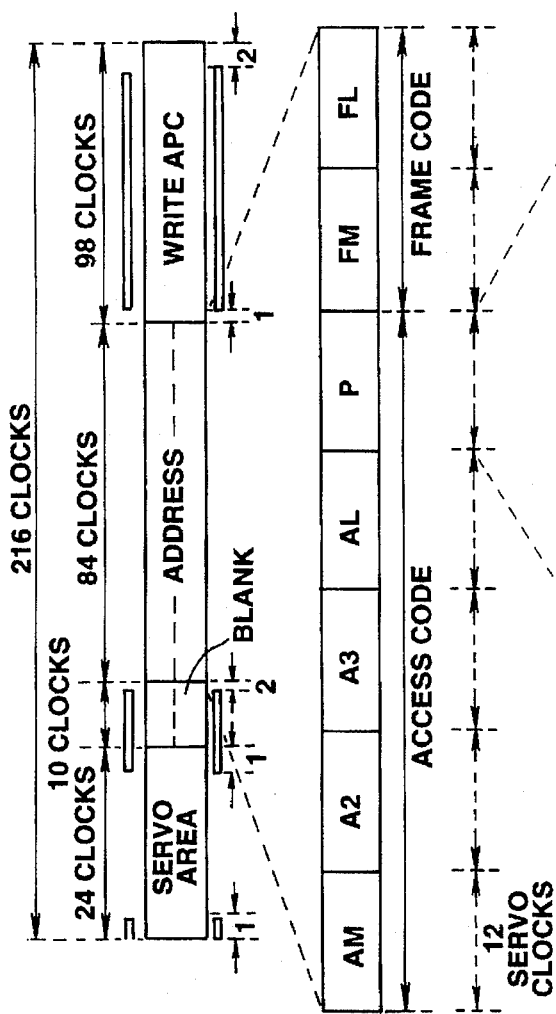
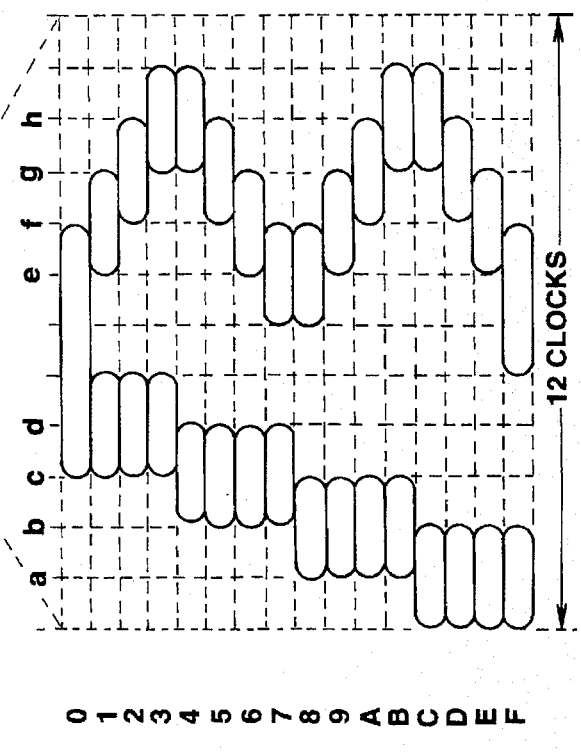
FIG.5A
FIG.5B
FIG.5C

| ZONE | OUTER RADIUS (Mm) | TRACKS | M | SECTOR | BYTE/SEG | SEG/SECTOR | MIN DENSITY | CAP (MB) |
|---|---|---|---|---|---|---|---|---|
| GCP | 42100 | | 24 | | | | | |
| BUFFER TRACKS | 41216.8 | 652 | 48 | 40 | 46 | 65 | 0.42817 | 0.078 |
| CONTROL TRACKS | 41214.4 | 2 | 48 | 100 | 46 | 65 | 0.42811 | 0.195 |
| BUFFER TRACKS | 41208.4 | 5 | 48 | 40 | 46 | 65 | 0.42808 | 0.078 |
| TEST TRACKS | 41206 | 2 | 48 | 100 | 46 | 65 | 0.42802 | 0.195 |
| USER ZONE 0 | 41200 | 5 | 48 | 20800 | 46 | 65 | 0.41745 | 40.625 |
| USER ZONE 1 | 40182.4 | 848 | 47 | 20800 | 45 | 53 | 0.41533 | 40.625 |
| USER ZONE 2 | 39145.6 | 864 | 46 | 20800 | 44 | 54 | 0.41291 | 40.625 |
| USER ZONE 3 | 38089.6 | 880 | 45 | 20800 | 43 | 55 | 0.40996 | 40.625 |
| USER ZONE 4 | 36995.2 | 912 | 43 | 20800 | 41 | 57 | 0.41589 | 40.625 |
| USER ZONE 5 | 35862.4 | 944 | 42 | 20800 | 40 | 59 | 0.41189 | 40.625 |
| USER ZONE 6 | 34691.2 | 976 | 40 | 20800 | 38 | 61 | 0.41716 | 40.625 |
| USER ZONE 7 | 33462.4 | 1024 | 39 | 20800 | 37 | 64 | 0.41166 | 40.625 |
| USER ZONE 8 | 32195.2 | 1056 | 37 | 20800 | 35 | 66 | 0.4158 | 40.625 |
| USER ZONE 9 | 30851.2 | 1120 | 35 | 20800 | 33 | 70 | 0.41931 | 40.625 |
| USER ZONE 10 | 29430.4 | 1184 | 34 | 20800 | 32 | 74 | 0.41024 | 40.625 |
| USER ZONE 11 | 27971.2 | 1216 | 32 | 20800 | 30 | 76 | 0.41165 | 40.625 |
| USER ZONE 12 | 26416 | 1296 | 30 | 20800 | 28 | 81 | 0.41133 | 40.625 |
| USER ZONE 13 | 24745.6 | 1392 | 28 | 20800 | 26 | 87 | 0.40891 | 40.625 |
| USER ZONE 14 | 22960 | 1488 | 25 | 20800 | 23 | 93 | 0.41738 | 40.625 |
| USER ZONE 15 | 20924.8 | 1696 | 24 | 9100 | 22 | 106 | 0.41557 | 17.773 |
| TEST TRACKS | 20000.8 | 770 | 24 | 50 | 22 | 110 | 0.41545 | 0.098 |
| BUFFER TRACKS | 19994.8 | 5 | 24 | 20 | 22 | 130 | 0.4154 | 0.039 |
| CONTROL TRACKS | 19992.4 | 2 | 24 | 50 | 22 | 130 | 0.41527 | 0.098 |
| BUFFER TRACKS | 19986.4 | 5 | 24 | 20 | 22 | 130 | 0.41522 | 0.039 |
| | 19984 | 2 | 24 | | | | | |
| GCP | 19000 | 820 | 24 | | | | | |

FIG.10

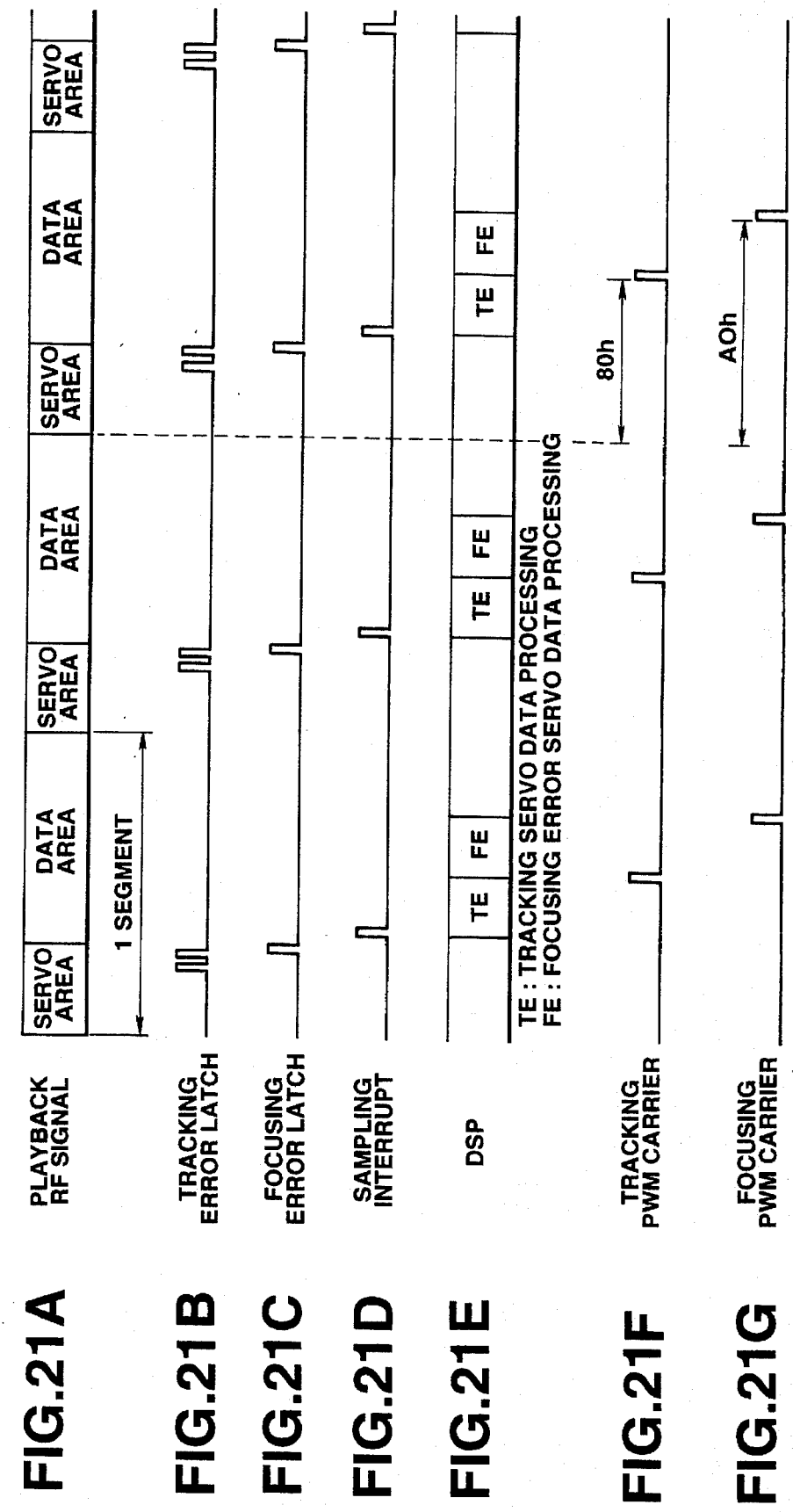

FOCUSING SERVO CONTROLLING APPARATUS

BACKGROUND OF THE INVENTION

1. Field of the Invention

This invention relates to a servo signal processing device provided in a recording or reproducing apparatus for an optical disc of a sample servo system, such as a magneto-optical disc, a compact disc or a write-once disc. More particularly, it relates to a focusing servo controlling device in which, when effecting sample servo by itself, such as during a focusing search, the output timing of the focusing servo signals is prompted for improving the phase allowance of the focusing servo loop for stabilizing focusing servo.

2. Description of the Related Art

The optical disc of the type having a sample servo system is well known. With the optical disc of this sample servo type, pre-set servo patterns are provided at a pre-set interval on the recording track. Recording data is recorded or reproduced between servo patterns as servo control is performed based upon playback signals of the servo patterns. The optical disc reproducing apparatus reproducing recorded data from an optical disc of the sample servo system is provided with a digital signal processor (DSP) for digitally processing servo error signals for effecting the servo control.

If reproduction of the recorded data is specified, the optical disc reproducing apparatus causes a laser beam to be illuminated on the optical disc via an optical system. Since the servo patterns are formed at a pre-set interval on the optical disc, the laser beam is irradiated on a servo area having the servo patterns recorded thereon and on a data area having recording data recorded thereon, in this order, as shown in FIG. 21a. One segment is made up of one servo area and one data area, such that the optical disc reproducing apparatus reproduces the recorded data with plural segments as one reproducing unit.

The reflected light is produced on irradiating the optical disc with the laser beam. The optical system receives this reflected light and accordingly forms RF signals while also forming tracking error signals and focusing error signals. These signals are sent to an A/D converter which is also fed with channel clocks generated by a phase locked loop (PLL) circuit based upon the repetition frequency of the servo patterns. Specifically, 216 channel clocks are formed for each segment. The A/D converter digitizes the RF signals, tracking signals and focusing signals based upon these channel clocks for forming and outputting RF data, tracking error data and focusing error data.

The RF data are supplied to a recording data detection system which then samples the RF data with the channel clocks of a pre-set frequency to reproduce recorded data and sends the reproduced data to e.g., an external equipment, such as a computer or a speaker. On the other hand, the tracking error data and the focusing error data are latched and outputted at the timing of reproduction of the servo area shown in FIG. 21a by a tracking error latch pulse and a focusing error latch pulse shown in FIGS. 21b and 21c, respectively.

The DSP is configured for operating based upon a software program routine, and captures latched tracking error data and focusing error data based upon sampling interrupt pulses supplied at the output timing of the latched error data, as shown in FIG. 21d. For correctly reproducing the recorded data, the tracking error data needs to be corrected more speedily than the focusing error signals. Consequently, the DSP processes the tracking error data, captured based upon the sampling interrupt pulses, before processing the focusing error data, similarly captured based upon the sampling interrupt pulses, as shown in FIG. 21e.

The DSP is fed with the channel clocks and counts the number of the channel clocks for each segment. The DSP outputs the tracking error data, processed as described above, at a timing when the count value reaches 128, or "80h" in hexadecimal notation, as shown in FIG. 21f. On the other hand, the DSP outputs the focusing error data, processed as described above, at a timing when the count value reaches 160, or "A0h" in hexadecimal notation, as shown in FIG. 21g.

The tracking error data and the focusing error data are supplied to respective servo systems. The servo systems effect phase compensation on the tracking error data and the focusing error data and accordingly servo-control the optical system in a direction of correcting the tracking errors and the focusing errors. This assures correct reproduction of recorded data in the "just-tracking" and in the "just-focusing" states at all times.

With the optical disc reproducing apparatus for reproducing the optical disc of the sample servo system, the tracking servo and the focusing servo are collectively controlled based upon the playback signals of the intermittently reproduced servo patterns. However, since it is necessary to improve response to tracking errors, tracking error data is processed and outputted in advance of the focusing error signals. If only the focusing servo is to be in operation, such as during focusing search or seek for effecting tentative focusing on the disc surface in advance of reproduction, the tracking servo is not required.

However, if the focusing error data is outputted in such a case at the same timing, it takes a lot of time from the time of sampling by the A/D converter until outputting of focusing error data from the DSP. The result is limitations imposed on the phase allowance of the servo loop and unstable servo states immediately after focusing servo engagement. Thus it may occur that a prolonged time elapses until the servo state becomes stabilized and, in the worst case, the focusing servo, once captured, is disengaged.

In view of this state of the prior art, it is an object of the present invention to provide a servo signal processing device in which, if the focusing servo is to be in operation by itself with the use of the optical disc of the sample servo system, the focusing error data is outputted more promptly for improving the phase allowance of the focusing servo loop for stabilizing the focusing servo.

Moreover, if the focusing servo is to be in operation by itself, e.g. during focus search or seek when tentative focusing is done on the optical disc surface prior to reproduction, the phase locked loop (PLL) circuit for the focusing servo becomes an open loop and is brought to the free running state. Thus, the frequency of the clocks for the focusing servo, outputted from the voltage controlled oscillator (VCO), is varied by about 20%. On the other hand, it takes from several msec to tens of msec from the time the focusing servo is engaged until the PLL circuit is locked. Consequently, if the focusing servo is captured under such conditions to close the PLL circuit to effect phase compensation of the focusing servo, arithmetic operations for the phase compensation filter become inaccurate such that accurate phase compensation becomes impossible. This problem is most acute directly after focusing servo capture when the focusing actuator amplitude is larger and hence the servo state becomes unstable and the focusing servo, once engaged, tends to be disengaged again even after phase compensation.

In view of the state of the prior art, it is another object of the present invention to provide a focusing servo controlling device in which, if the focusing servo is to be in operation by itself with the use of the optical disc of the sample servo system, phase compensation directly after focusing servo capture is accurate to enable stable focusing servo to be achieved.

SUMMARY OF THE INVENTION

According to a first aspect of the present invention, there is provided a servo signal processing device in which at least tracking servo signals and focusing servo signals formed based upon playback output of a pre-set servo pattern intermittently reproduced from an optical disc on which the servo patterns are arrayed at a pre-set interval are engaged and outputted at a preset timing in the order of the tracking servo signal and the focusing servo signal, wherein the improvement comprises output timing control means for controlling the output timing of the focusing servo signals so that, when the focusing servo is effected by itself, the output timing is prompted at a pre-set time for outputting only the focusing servo signals.

According to a second aspect of the present invention, there is provided a focusing servo controlling device of a phase-locked loop configuration in which the focusing servo is effected based upon focusing servo clocks formed by a playback output of pre-set servo patterns from an optical disc on which the servo patterns are arrayed at pre-set intervals.

The focusing servo controlling device includes fixed clock outputting means for outputting fixed clocks for a focusing servo of a fixed frequency, switching means for switching between outputting the focusing servo clocks or the fixed clocks, and control means for effecting switching control of the switching means for selecting and outputting the fixed clocks when effecting the focusing servo alone and for effecting switching control of the switching means for selecting and outputting the focusing servo clocks directly after engagement of the focusing servo.

With the focusing servo controlling device of the present invention, the control means effect switching control of the switching means for selecting and outputting the fixed clocks, when effecting the focusing servo alone, while effecting switching control of the switching means for selecting and outputting the focusing servo clocks directly after engagement of the focusing servo, thereby stabilizing the servo state during the focusing servo capture.

With the servo signal controlling device according to the present invention, the output timing of the focusing servo signal is controlled so that, when the output timing control means effects only the focusing servo, the output timing is prompted at a pre-set time so that only the focusing servo signals will be outputted.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 5A–5C are diagrams for use in explaining a format of a servo area of an access code recorded in an address segment of the magneto-optical disc.

FIG. 10 is a diagram of a setting parameter for zone division in the magneto-optical disc.

FIGS. 21(a) to 21(g) are timing charts for illustrating the operation of performing both tracking servo and focusing servo in the recording/reproducing apparatus for the magneto-optical disc.

DETAILED DESCRIPTION OF THE PREFERRED EMBODIMENTS

Figure 1:
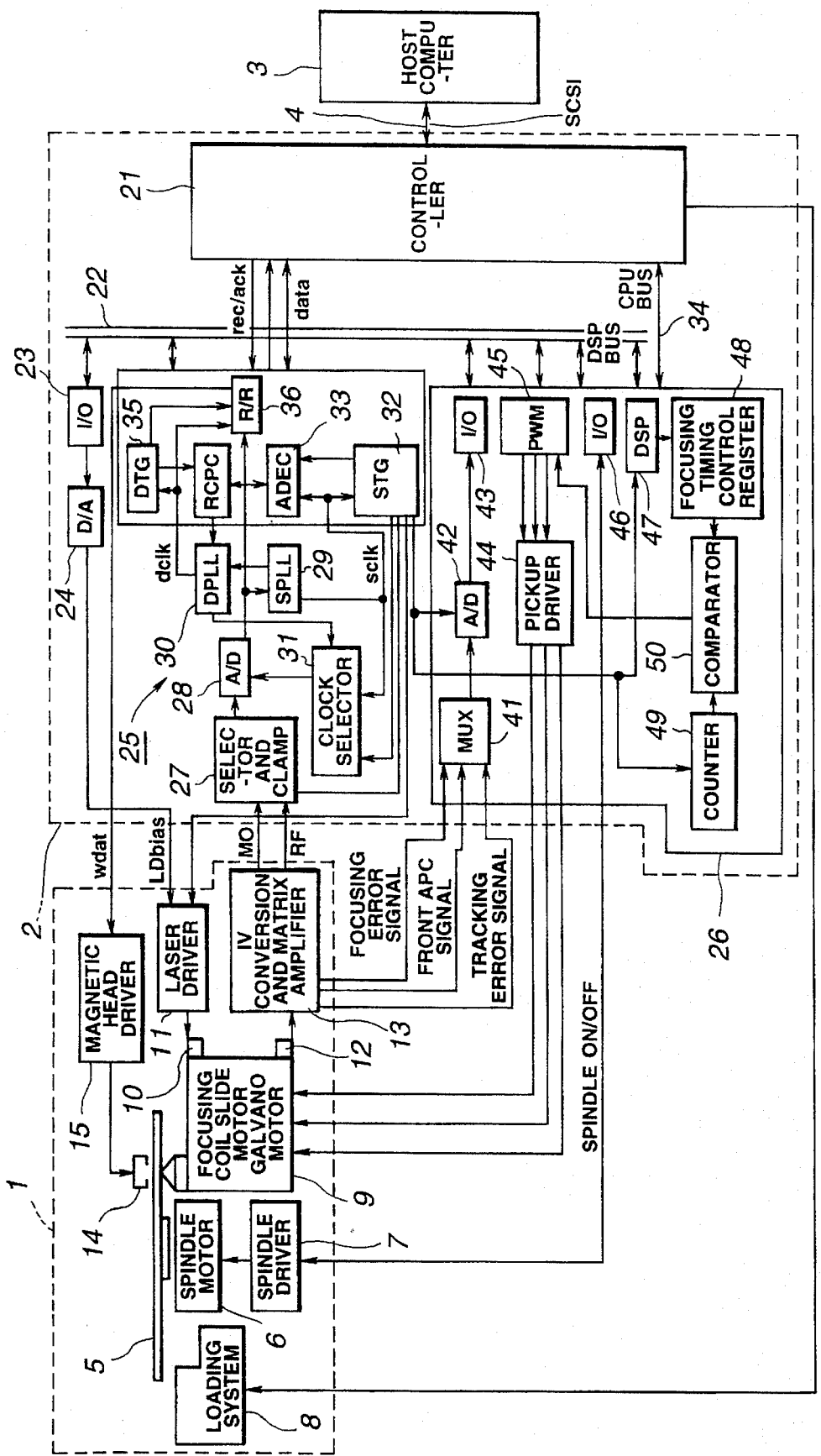
FIG. 1 is a block diagram of a recording/reproducing apparatus for a magneto-optical disc employing a servo signal processing device of the present invention.

Referring to the drawings, a preferred embodiment of a focusing servo controlling device according to the present invention will be described in detail.

The focusing servo signal controlling device according to the present invention may be applied to a recording/reproducing apparatus for a magneto-optical disc shown in FIG. 1. The recording/reproducing apparatus for a magneto-optical disc is of the sample servo system and is made up of a disc drive 1 and a control block 2. Commands and data are exchanged with a host computer 3 over a SCSI bus 4 connected thereto.

The disc drive 1 includes a spindle motor 6 for rotating the magneto-optical disc 5 at a constant angular velocity and a spindle driver 7 rotating the spindle motor 6. The disc drive 1 also includes a loading mechanism 8 for loading the magneto-optical disc 5 within the disc drive 1, and a pickup 9 for radiating a laser beam to the magneto-optical disc 5. The disc drive 1 also includes a laser diode 10 for radiating a laser beam on the magneto-optical disc 5 and a laser driver 11 for exciting the laser diode 10 for radiating the laser beam of a constant recording level during data recording and for radiating the laser beam of a constant reproducing level during data reproduction.

The disc drive 1 includes a photodetector 12 for receiving reflected light of the laser beam radiated on the magneto-optical disc 5 for generating RF signals, tracking error signals and focusing error signals, and a current-to-voltage converting block (IV converting block) 13 for converting the RF signals supplied from the photodetector 12 as current into voltage, amplifying the resulting voltage at a pre-set gain and outputting the resulting amplified voltage. The disc drive 1 also includes a magnetic head 14 for applying a magnetic field modulated in accordance with data during data recording, and a magnetic head driver 15 for driving the magnetic head 14 in accordance with recording data.

The control block 2 is constructed by connecting a data processing block 25 and a servo control block 26 via a digital signal processor (DSP) bus 22 and a central processing unit (CPU) bus 34 to a controller 21. The host computer 3 is connected via the small computer system interface (SCSI) bus 4 to the controller 21.

The data processing block 25 has an input/output (I/O) block 23 which is fed with front auto-power control (FAPC) data for controlling the laser level of the laser beam radiated on the magneto-optical disc 5, depending upon the laser level detected in the forward path of the laser beam radiated on the magneto-optical disc 5, and a D/A converter 24 for converting the FAPC data into corresponding analog signals (LDbias) which are supplied to the laser driver 11.

The data processing block 25 also includes a selector and clamping circuit 27 for selecting and clamping the magneto-optical (MO) signal and the RF signal from the IV converting block 13 of the disc drive 1 based upon timing clocks for a servo control system from a servo system timing generator (STG) 32 as later explained, a servo clock generating circuit (SPLL) 29 of a phase locked configuration for generating servo clocks (sclk) and a data clock circuit (DPLL) 30 of a phase locked configuration for generating data clocks (dclk).

The data processing block 25 further includes a clock selector 31 for selecting the servo clocks (sclk) or the data clocks (dclk) based upon timing clocks from the STG 32 and an A/D converter 28 for digitizing the RF signal or the MO signal from the selector and clamping circuit 27 with clocks selected by the clock selector 31. The data processing block 25 also includes a data system timing generator (DTG) 35 for forming data-processing timing clocks based upon data clocks (dclk) from the DPLL 30, and a recording/reproducing (R/R) circuit 36 for supplying recording data (wdat) to the magnetic head driver 15 based upon data clocks (dclk) from the DPLL 30 and data-processing timing clocks from the DTG 35 and for supplying reproduced data via the controller 21 to the host computer 3.

The servo control block 26 includes a multiplexor (MUX) 41 for selecting and outputting the focusing error signals, FAPC signals and tracking error signals from the IV converting block 13 of the disc drive 1, an A/D converter 42 for digitizing the signal from the multiplexor 41 based upon servo clocks from the SPLL 29 (via the STG 32), an I/O block 43 fed with A/D converted data and a digital signal processor (DSP) 47 for executing digital signal processing of the recording/reproducing apparatus for the magneto-optical disc.

The servo control block 26 also includes an I/O block 46 to and from which control data for controlling the rotation of the spindle motor 6 of the disc drive 1 are entered or outputted, a pickup driver 44 for controlling the focusing and tracking of the pickup 9, and a pulse width modulation (PWM) circuit 45 for pulse width modulation driving of the pickup driver 44. The servo control block 26 further includes a focusing timing control register 48 for setting the output timing control data of the focusing error data by the DSP 47, a counter 49 for counting the number of servo clocks from the SPLL 29, and a comparator 50 for controlling the PWM circuit 45 so that focusing error data will be outputted by the PWM circuit 45 at a timing of coincidence between the count value specified by data set in the focusing timing control register 48 and the count value from the counter 49.

Figure 2:
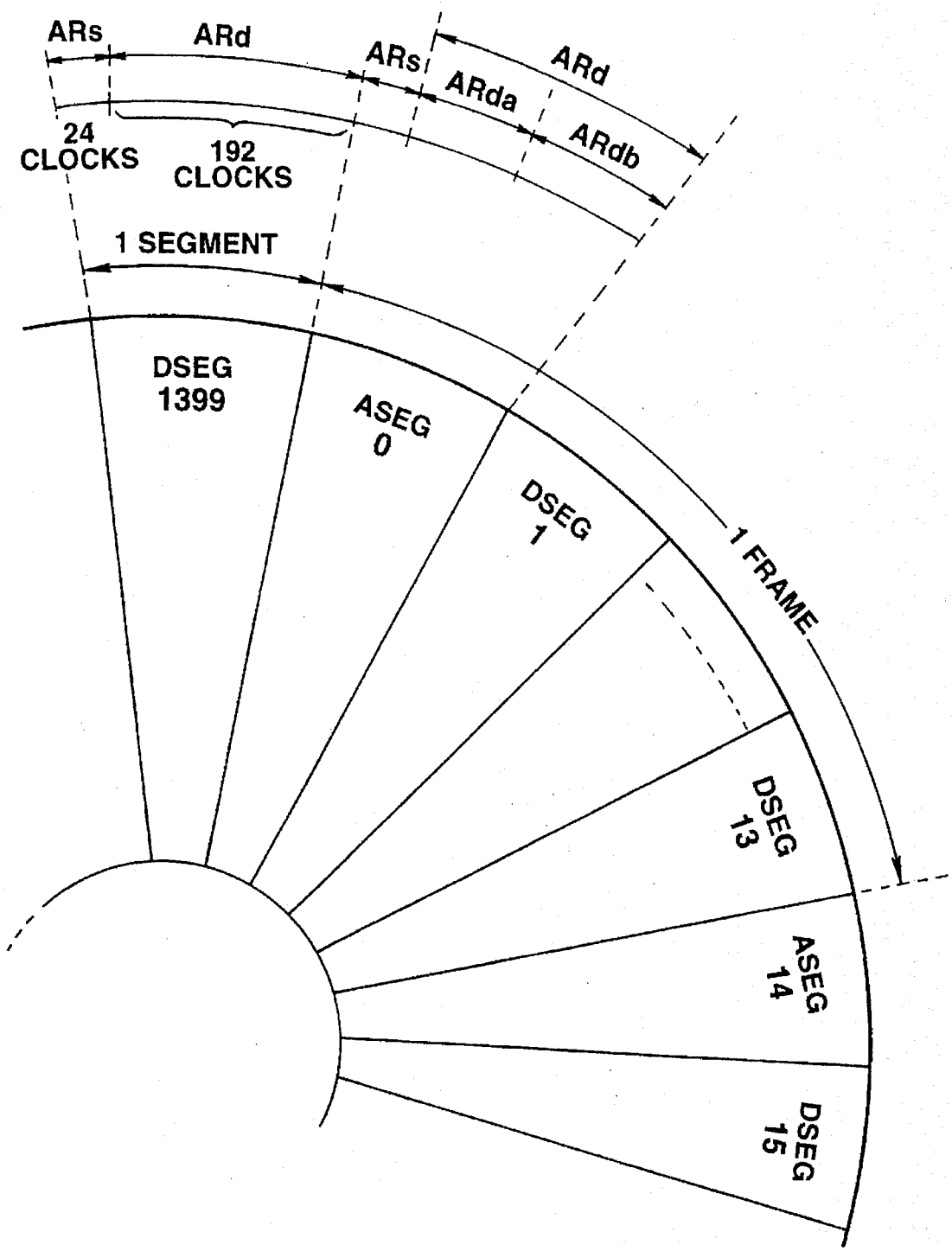
FIG. 2 is a diagram of a segment construction of a magneto-optical disc employed for recording/reproduction in the recording/reproducing apparatus of FIG. 1.

The magneto-optical disc 5 employed in the recording/reproducing apparatus has a complete turn of a track divided into 1400 segments (0–1399), as shown in FIG. 2. These segments are classified into two kinds of segments: an address segment ASEG and a data segment DSEG.

In the address segment ASEG, the position information in the radial direction of the disc and that in the tangential direction of the disc are recorded as pre-pits. The address segment is provided every 14 segments, so that 100 address segments are provided in one turn of the track. Each frame is formed from one address segment, e.g. ASEG 0, to the next address segment, e.g. ASEG 14. There are address segments ASEG for 100 frames in one complete turn of the track, and 13 data segments DSEG are formed between any two address segments ASEG. Thus, there are 1300 data segments DSEG in one complete turn. Each segment, whether an address segment ASEG or a data segment DSEG, is made up of a servo area ARs having a duration of 24 clock cycles and a data area ARd having a duration of 192 clock cycles (for a total of 216 clock cycles).

The data portion of the address segment ASEG includes an address section ARda which contains address information and a laser control section Ardb which is used by the disk drive components shown in FIG. 1 to control various operation parameters of the laser beam used to scan the magneto-optical disk. The format of the servo area ARs of the address segment and of the different types of data segments is shown in FIGS. 3A–3D. Each servo area contains three prerecorded pits, identified as a segment mark pit Pa and wobble pits Pb and Pc. The positions of the wobble pits are fixed and the position of the segment mark pit Pa is dependent upon the particular type of segment in which that segment mark pit Pa is recorded. Referring first to the wobble pits Pb and Pc, these pits are located at clock cycles 11 and 16 and are offset from the center line of the track by, for example, ¼ of the track pitch, as shown in FIGS. 3A–3D. These wobble pits are used for tracking control. It is appreciated that if the scanning laser beam is offset, or displaced from the center line of the track, the signal produced from one of the wobble pits Pb or Pc will be greater than the other. Thus, an indication of the direction and intensity of a tracking error is produced and may be readily compensated. In addition, since the positions of the wobble pits Pb and Pc are fixed, pulses produced by scanning these pits will exhibit a frequency determined by the speed of the disk, thereby permitting a servo clock (from which system clock pulses are generated) to be synchronized therewith.

As shown in FIGS. 3A–3D, each servo area in each segment includes a section ARfs in which no pits are recorded. The focus sample area ARfs of the servo area ARs is a mirror portion and is used for the focusing servo, read power APC (automatic power control) or RF signal clamping. The positions of various sample pulses for theses operations are difficult to identify correctly, such that variations not larger than ±5 servo clocks may be estimated. The format of the pits shown in FIGS. 3A–3D is preferred because it minimizes that portion of the disk in which no pits are formed, known as the mirror portion, thereby reducing the possibility that "ghost pits" will be produced during the disk molding process. It is preferred, therefore, to record each pit with a duration of two clock cycles and to separate the pits in the servo portion by at least 5 clock cycles. Consequently, inter-pit interference may be kept desirably small.

The position at which the segment mark pit Pa is recorded in the leading section of each servo portion identifies the segment as either an address segment ASEG or a data segment DSEG. If it is a data segment, the position of the segment mark pit Pa also identifies the data segment as the first data segment in a sector, the last data segment in the sector, or any other intermediate data segment in the sector. The number of segments in a sector is dependent upon the radial position of that sector. Referring to FIGS. 3B–3D and 4, if the segment mark pit Pa is recorded in clock cycles 3–4 of a segment, that pit (ADDRESS MARK) identifies the segment as an address segment ASEG. If the segment mark pit Pa is located at clock cycles 4–5, the pit (SECTOR MARK 1) identifies the segment as a data segment DSEG II, and moreover, as the leading, or first, data segment in the sector. If the segment mark pit Pa is located at clock cycles 5–6, the pit (SECTOR MARK 2) identifies the segment as the last data segment DSEG III of a sector. Finally, if the segment mark pit Pa is located at clock cycles 6–7, the pit (SEGMENT MARK) identifies the segment as any data segment DSEG I, other than the first or last, in the sector. The presence and position of a segment mark pit Pa are determined by generating sampling pulses at those clock cycles identified as A, B, C and D, shown in FIGS. 3A–3D, and 4. Thus, if a segment mark pit Pa is sensed by sampling pulse A, the segment in which that segment mark pit is located is identified as an address segment. If the segment mark pit is sensed by sampling pulse B, the segment is detected as the first segment of a sector. If the segment mark pit Pa is sensed by sampling pulse C, the segment is detected as the last segment of a sector. Further, if the segment mark pit Pa is sensed by sampling pulse D, the segment is detected as any intermediate segment in the sector.

It is appreciated that since the identification of a segment is readily determined simply by sensing the position of the segment mark pit Pa, it is not necessary to provide substantial segment identifying data which might detract from the amount of data that can be recorded in the data portion of each segment. As a result, the servo portion can be made smaller and information is recorded with higher efficiency.

Figure 6:
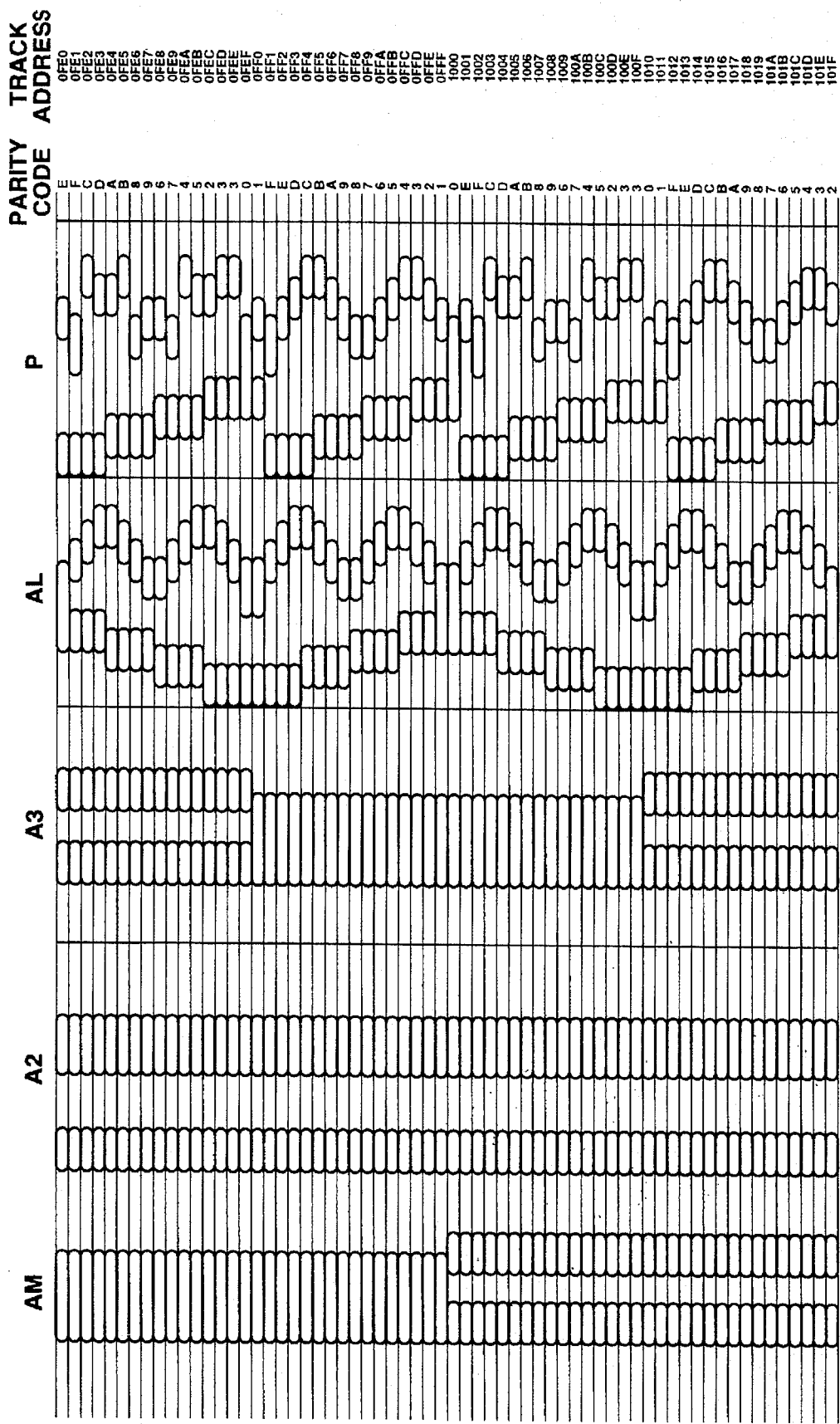
FIG. 6 illustrates an example of the access code.

FIGS. 5A–5C represent the information that is recorded in an address segment ASEG. The construction of the address information included in the data portion of the address segment is shown in FIG. 5B and includes an access code and a frame code. The access code includes a 16-bit track address formed of 4-bit groups AM, A2, A3, and AL together with a parity code P. This track address is recorded in Gray code and identifies the radial position of the address segment. The frame code identifies the frame address FM and FL, thereby identifying the frame in which the address segment is recorded, and this identifies the circular position of that frame in a turn. The track addresses and the frame addresses are recorded in Gray code, as illustrated in FIG. 6 which shows the track addresses in Gray code.

The access code is formed of 4-bit groups in which the 1's complement of each group is converted. The value of the 4-bit group AM is considered the most significant value or number (MSN) and the value of the 4-bit group AL is considered the least significant number (LSN). The 1's complement conversion is carried out in this order so that the access codes are changed by only one pattern across neighboring turns or tracks. Similarly, the frame code is an 8-bit frame address formed of two 4-bit groups FM and FL. Here too, the frame code is recorded as Gray code information.

Figure 7:
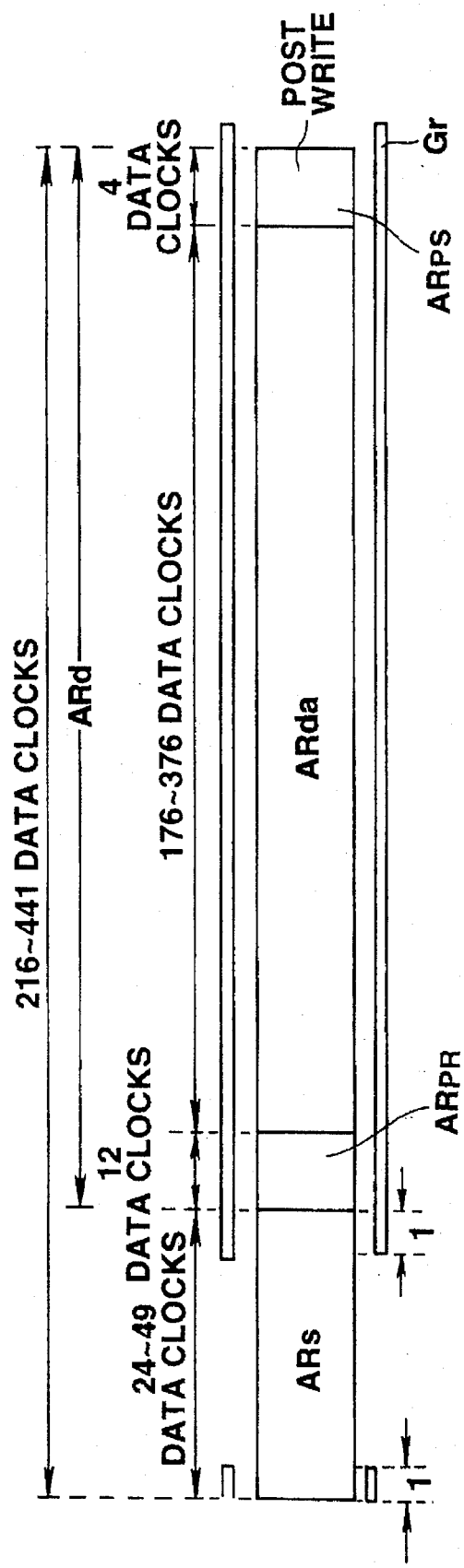
FIG. 7 is a diagram of the format of a data segment of the magneto-optical disc.

Referring now to FIG. 7, the data area ARd of the data segment DSEG is made up of the data area ARda of 176 to 376 data clocks for recording user data, a pre-write area ARpr of 12 data clocks, and a post-write area ARps of four data clocks. The pre-write area ARpr is provided for securing a distance required for pre-heating after laser irradiation until stabilization of the disc temperature and for use as a clamp area for suppressing DC fluctuations caused by double refraction of MO signals. The post-write area ARps is provided for assuring a distance for eliminating insufficient erasure of recorded data and for avoiding interference otherwise caused by the edge of a groove Gr. The groove Gr is formed in the data area ARd and is not employed for tracking and hence it is not required to be precise in depth. By providing the groove Gr, the mirror portion as required may be decreased to alleviate ill effects on servo pits caused due to disc molding.

The MO disc is unidirectionally bulk-erased at the time of shipment, so that the disc may be used without requiring a formatting operation. By recording data of the same magnetic properties as those in the bulk erasure direction on the pre-write area ARpr, recorded data remains unchanged even if data cannot be correctly recorded on the pre-write area ARpr due to insufficient residual heat of the recording medium, so that a stable signal may be reproduced.

Figure 8:
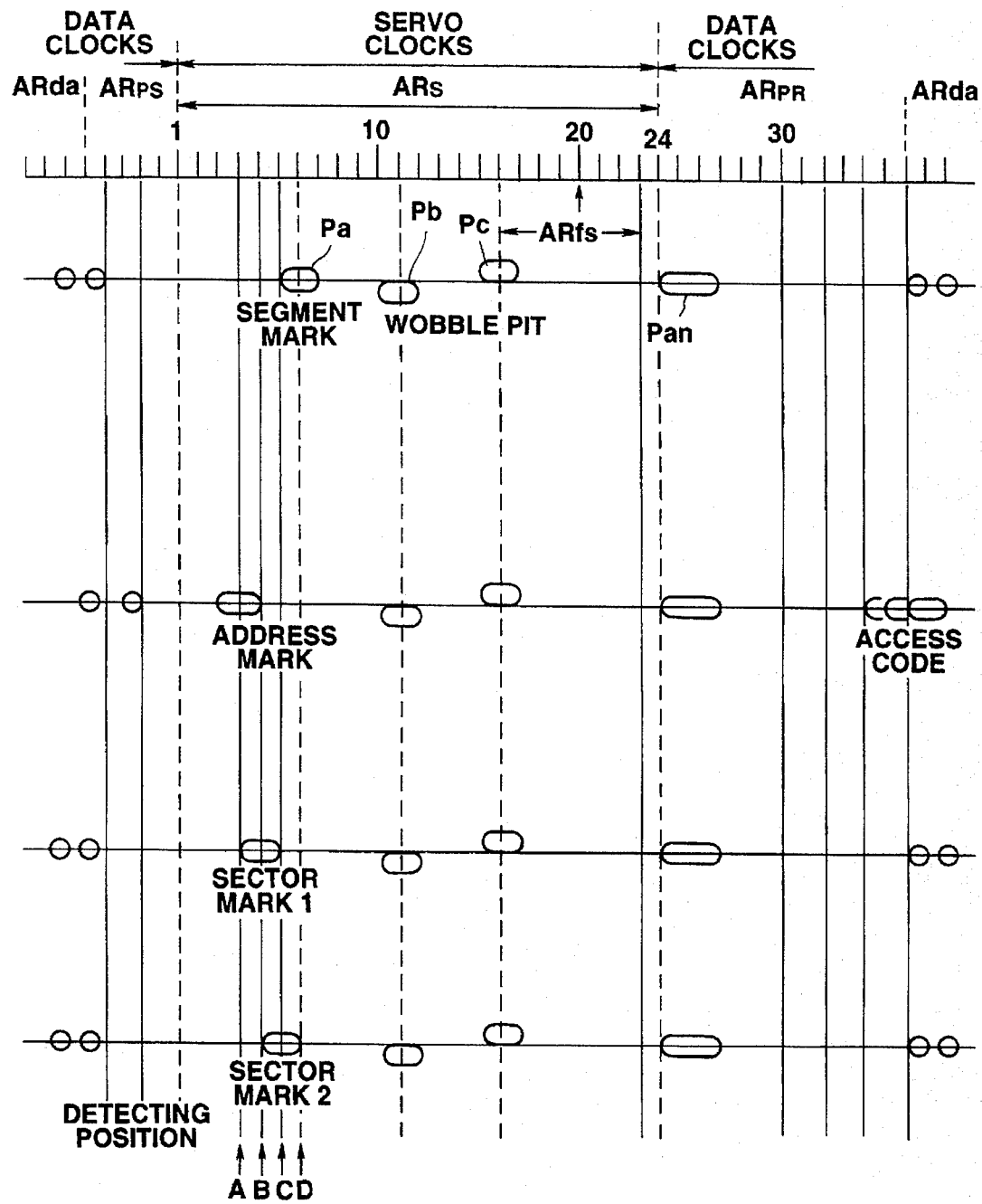
FIG. 8 is a diagram of a format of a servo area of a ROM disc.

The foregoing description refers to a magneto-optical disc 5 for recording/reproduction. If the disc is a replay-only ROM disc, 3-clock duration anchor pits Pan are provided at the leading end of the pre-write area ARpr as shown in the upper right corner of FIG. 8, so that the mirror portion as required may be decreased to alleviate any ill effects on servo pits due to the disc molding process.

Figure 9:
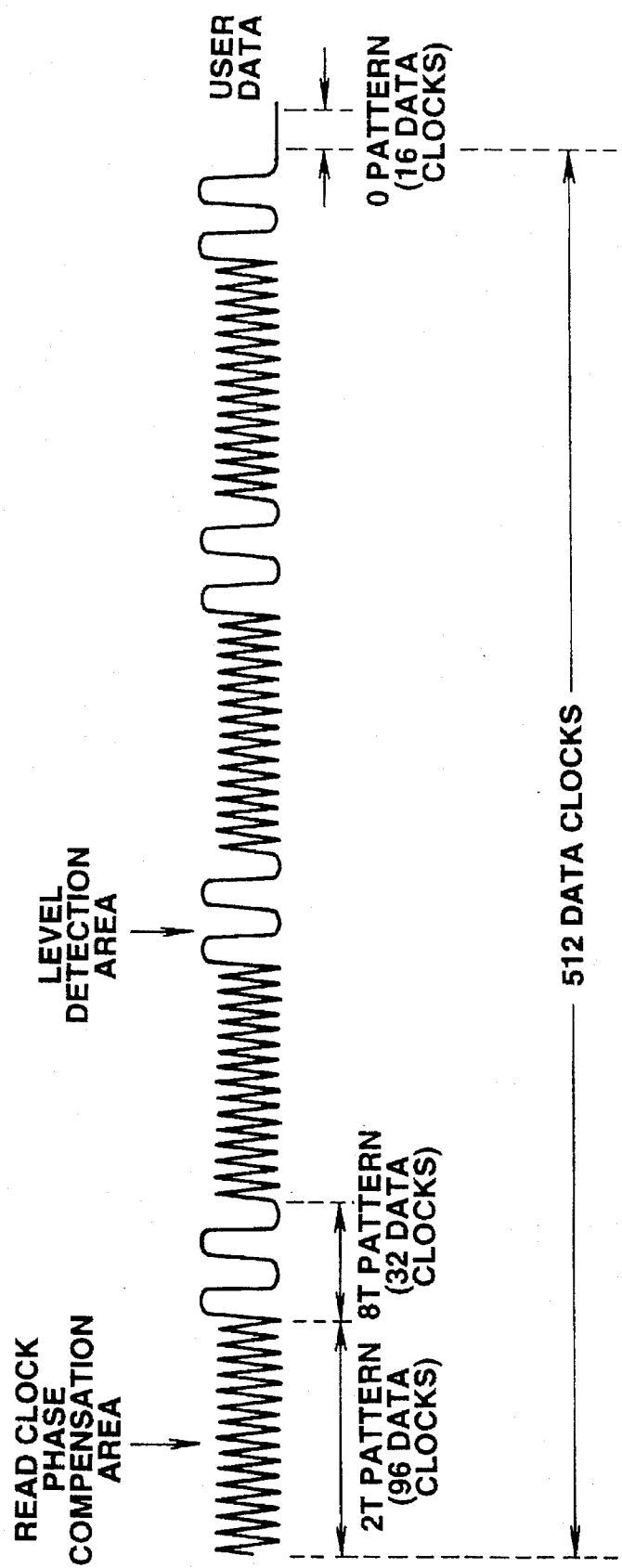
FIG. 9 is a diagram of a reference pattern of a data sector of the magneto-optical disc.

Each data sector is made up of 66 bytes of reference data, 2048 bytes of user data (D0 to D2047), 256 bytes of ECC (E1,1 to E16, 16), 8 bytes of CRC (CRC 1 to CRC 8), 8 vender unique bytes and 32 bytes of user defined data (UD), totaling at 2418 bytes. Referring to FIG. 9, 66 bytes of specified patterns, made up of four blocks, each consisting of 4 bytes of 8T patterns and 12 bytes of 2T patterns, and 2 bytes of all 0s as allowance for setting the detected information, are recorded as the reference data. The 8T pattern is employed for setting the three-value level (high H, mid M and low L) for data detection, while the 2T pattern is used for correcting the DC-derived pit position shift, caused by e.g., recording power variation, during reproduction. In the data area ARd of the data segment DSEG, data other than the 66 bytes of reference data are scrambled, and the scrambled data are NRZI converted and recorded on the segment basis.

Figure 11:
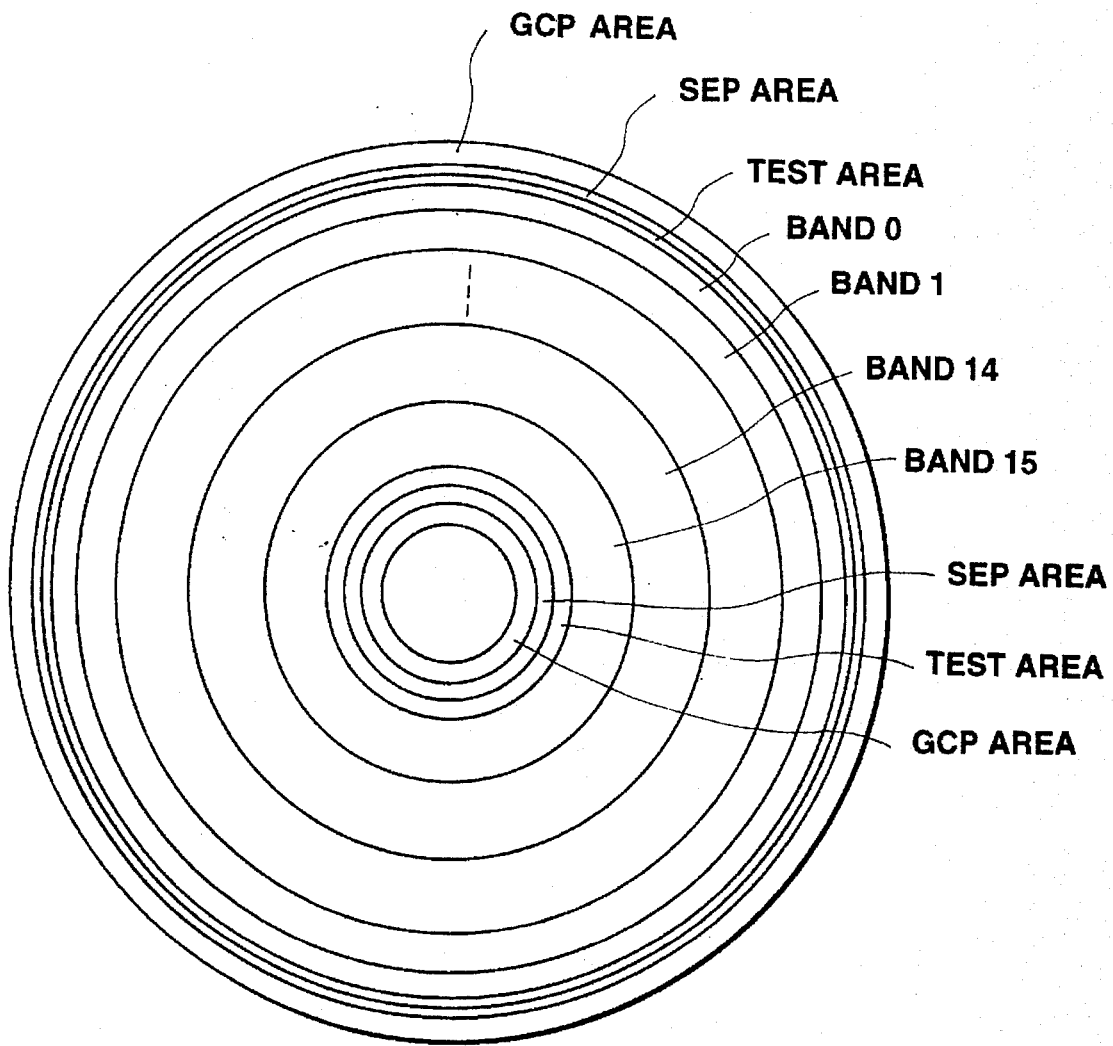
FIG. 11 is a diagram of the state of zone division in the magneto-optical disc.
Figure 12:
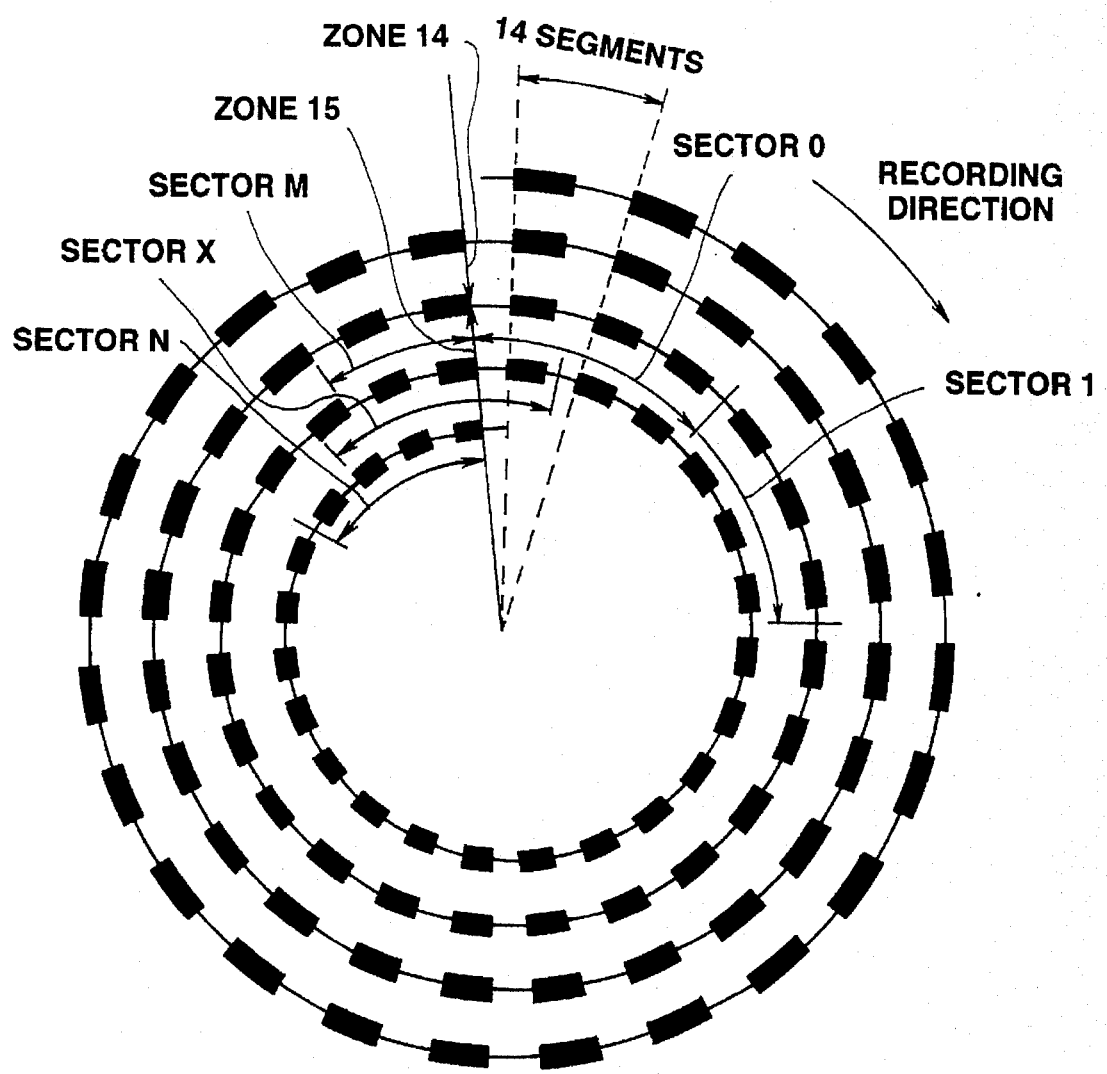
FIG. 12 is a diagram of a sector format in the magneto-optical disc.

As shown in FIGS. 10 and 11, this optical disc is a zone CAV disc, and is made up from the outer rim part of a GCP (Gray Code encoded Part of the control track) band of 736 tracks, a 2-track buffer track, a 5-track control track, a 2-track buffer track, a 5-track test track, an 848 track user zone 0, an 864-track user zone 1, an 880-track user zone 2, a 912-track user zone 3, a 944-track user zone 4, a 976-track user zone 5, a 1024-track user zone 6, a 1056 track user zone 7, an 1120 track user zone 8, an 1184 track user zone 9, a 1216 track user zone 10, a 1296 track user zone 11, a 1392 track user zone 12, a 1488 track user zone 13, a 1696 track user zone 14, a 770 track user zone 15, a 5-track test track, a 2-track buffer track, a 5-track control track, a 2-track buffer track and an 820-track GCP band.

If, with the number of tracks (TRACzone) in a zone, the number of data segments (DSEGsect-zone) required for a sector in a zone, and the number of data segments per track (DSEGtrack), the sector is to be completed from zone to zone and the number of sectors is to be constant, it suffices to determine the number of tracks so that the number of sectors (SCTzone) in a zone is:

SCTzone=TRACzone*DSEGtrack/DSEGsect-zone, and

TRACzone=K*DSEGsect-zone, where K is the total number of zones.

All parameters may be obtained by allocating the approximate data capacity per zone, obtained on dividing the data capacity of the entire disc by K, from the outer rim side zone, and by determining the data clock frequency so that the recording density of the innermost track of the zone will not fall below a pre-set density.

If, in this case, a sector is started from a segment, the number of segments making up the sector and the sector are terminated and, even if there exist redundant bytes in the last segment, the next sector is started with the next segment. Thus, at the leading end of a zone, a sector necessarily starts with a 0 frame code sector. In the innermost zone, the number of sectors is not necessarily the same as the number of sectors in the remaining zones, but a fractional sector is likely to be produced. However, the innermost zone may be terminated at a track whose sector ends at the segment 0 for facilitating calculation of the parity sector capacity.

With the present magneto-optical disc 5, the user zone is divided into 16 zones, as described above, and the number of data bytes per segment (bytes/seg) and the number of segments per sector (seg/sector) are determined by the servo clock sclk times M/N (where M and N are integers). That is, if the number of servo clocks sclk in the servo area ARs is N, the integer variable M which is specified zone by zone is defined as DCLK shown in FIG. 10, and the number of data clocks equals the number of servo clocks times M/N, the number of servo clocks per segment (SCLKseg) and the number of data clocks per segment (DCLKseg) are given by:

SCLKseg=9N

DCLKseg=(SCLKseg)×(M/N).

Figure 13:
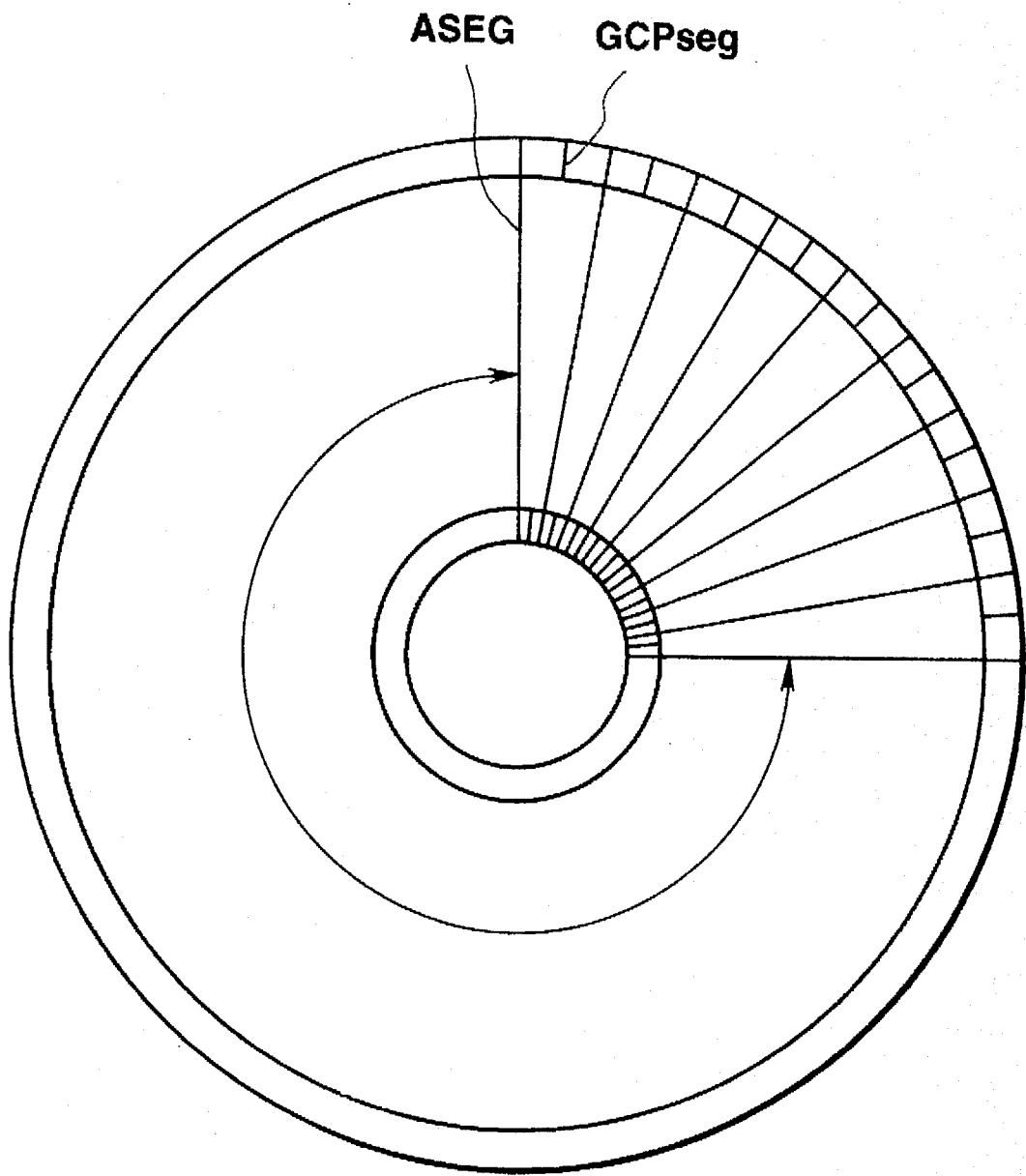
FIG. 13 is a diagram of the arraying state of GCP segments in the magneto-optical disc.
Figure 14:
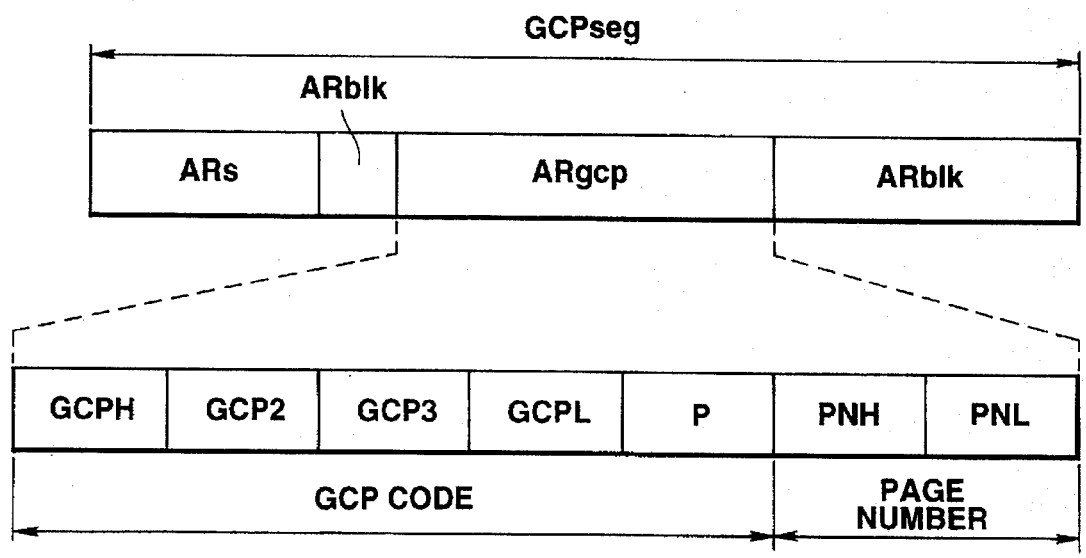
FIG. 14 is a diagram of the construction of the GCP segment.

Each track is divided into 1400 segments, as described above. Of these, 1300 are data segments DSEG. Since no data are recorded in the GCP band, 100 of the 1300 data segments are used as GCP segments GCPseg for recording the GCP information, such as media information. The GCP segment GCPseg is allocated to a data segment at a mid position of each address segment ASEG, as shown in FIG. 13. The GCP segment GCPseg is made up of the servo area ARs and the GCP area ARgcp located between two blank areas ARblk, as shown in FIG. 14. As in the address segment ASEG, there are recorded in the GCP area ARgcp seven 4-bit data, that is [GCPH], [GCP2], [GCP3], [GCPL] and parity [P] and page numbers [PNH] and [PNL], as pits in the Gray code in the same way as the access code. The GCP codes permit error detection due to appendage of parity [P]. In addition, plural sorts of media information may be afforded as the GCP information by the addition of the page number [PNH] and [PNL]. If the volume is less than 16 pages, the same information may be recorded in [PNH] and [PNL] for invulnerability to errors.

By arranging each GCP segment GCPseg in a state of coincidence with the page number of the GCP segment GCPseg of the lowermost bit of the address recorded in the address segment ASEG (frame number), misreading of the frame number of the address segment ASEG or the page number of the GCP segment GCPseg may be eliminated. Also, by iteratively recording ten sorts of the GCP information ten times, misreading of the ten sorts of the GCP information may be diminished.

Referring again to FIG. 1, the operation of the recording/reproducing apparatus for the magneto-optical disc of the illustrated embodiment will now be explained. An exchange of commands and data is executed with the host computer 3 connected via the SCSI bus 4. Processing for the exchange of commands and data is controlled by a controller 21 of the control circuit block 2. The controller 21 appends CRC and error correction codes to data from the host computer 3 during recording and transfers the data to the disc drive 1. For reproduction, data from the disc drive 1 is corrected for errors and only user data portions are transferred to the host computer 3. Commands to the servo system and respective blocks of the disc drive 1 are given by the DSP 47 which performs necessary processing responsive to commands from the controller 21.

Specifically, the DSP 47 is responsive to a request from the host computer 3 in the state in which the magneto-optical disc 5 is loaded by the loading unit 8 on a turntable to command the spindle driver 7 via I/O block 46 to rotate the spindle motor 6. The DSP 47 may also issue a similar command when the magneto-optical disc 5 is loaded when the automatic spin-up mode is set. When the spindle motor 6 reaches a pre-set rpm, the spindle driver 7 issues a lock signal to apprise the DSP 47 that the rotation has been stabilized. During this time, the DSP 47 shifts an optical pickup 9 by the pickup driver 44 towards the outer rim and the inner rim so that the pickup is positioned outside the user area. If the focusing is captured in the user area, there is a risk of inadvertent data erasure if the disc is a highly sensitive disc. By capturing focusing in an area outside the user area, such as the GCP area outside the recording area, inadvertent data erasure may be prohibited from occurring.

When the spindle motor 6 reaches a constant rpm and the pickup 9 is moved to the vicinity of the outer rim, for example, the DSP 47 sets the bias current LDbias to the laser driver 11 via the D/A converter 24 from the I/O block 23 and issues a command to the servo timing generator (STG) 32 to emit the laser light. The STG 32 controls the on/off of the laser diode 10. This causes the laser beam to be emitted from the laser diode 10 and radiated on the magneto-optical disc 5.

The reflected laser beam is received by the photodetector 12 provided in the pickup 9. The photodetector 12 forms MO and RF signals, based upon the level of the received reflected light, and forms tracking error signals, focusing error signals and FAPC signals for controlling the laser level of the laser beam. These signals are sent to the IV conversion block 13. The IV conversion block 13 converts the above signals, supplied as electrical current, into an electrical voltage. The IV conversion block 13 sends the MO and RF signals to the selector and clamp circuit 27, while sending the tracking error signals, focusing error signals and FAPC signals to the multiplexor 41, which then time-divisionally selects the tracking error signals, focusing error signals and FAPC signals and sends the selected signals to the A/D converter 42. The A/D converter 42 digitizes the time-divisionally supplied tracking error signals, focusing error signals and FAPC signals based upon servo clocks sclk from the SPLL circuit 29 as later explained, and sends the digitized signals to the DSP 47 via the I/O block 43 and the DSP bus 22.

The DSP 47 detects the laser level based upon the FAPC data and feeds back the light intensity control data calculated by a digital filter to the laser driver 11 via the I/O block 23 and the D/A converter 24 for controlling the laser power of the laser diode to be constant. The DSP 47 also causes the electrical current to flow from the PWM circuit 45 through a focusing driver of the pickup driver 44 for vertically actuating the focusing actuator of the pickup 9 for establishing the focusing search state as later explained. The reflected light from the magneto-optical disc 5 is detected by the photodetector 12. A detection output of the photodetector 12 is converted by the IV conversion block 13 into an electrical voltage which is supplied as a focusing error signal to the multiplexor 41 via a matrix amplifier.

Similarly to the FAPC signal, the focusing error signal is digitized by the A/D converter 42 as a signal time-divisionally selected by the multiplexor 41 so as to be supplied via the I/O block 43 to the DSP 47. The DSP 47 feeds back the focusing control data obtained on digitally filtering the digitized focusing error signals from the PWM circuit 45 to the focusing driver of the pickup driver 44 for establishing the focusing servo loop. On stabilization of the focusing servo, the RF signals produced by the IV conversion block 13 from the detection output of the photodetector 12 are rendered constant in amplitude to some extent and clamped to a suitable potential by the selector and clamp circuit 27 before being converted into digital signals by the A/D converter 28. The sampling clocks sclk are of a frequency in the free-running state of the servo clock generating (SPLL) circuit 29. For the timing pulse during clamping, a signal obtained on frequency-dividing the free-running frequency by a pre-set value by the STG 32 is employed.

The SPLL circuit 29 checks the difference in amplitude of RF signals digitized by the A/D converter 28 to check a pit patterning in order to search for the same pattern as that of a pre-set pit row in the servo area. If this pattern is found, the SPLL circuit 29 controls the clock selector 31 so that the window is opened at a timing of possible appearance of the next pattern, and checks for possible pattern coincidence. If this operation is confirmed a pre-set number of times, the SPLL circuit 29 is deemed to be in a locked state with respect to the disc. The phase information is obtained by adding the amplitude difference at both edges of the wobble pit Pb or Pc in the servo area. The phase information data obtained from each of the two wobble pits Pb or Pc are summed for absorbing gain fluctuations caused by amplitude changes ascribable to the tracking position.

When the SPLL 29 is locked, the segment-based position becomes definite such that the segment mark position also becomes recognizable. The clock selector 31 is controlled for opening windows at the four positions A, B, C and D shown in FIGS. 3A–3D and 4 for searching the maximum amplitude position among the RF signals sampled at the four positions A, B, C and D. If the result is A, it can be recognized that the bit is an address mark, with the segment being an address segment ASEG and being at the leading end of the frame. Thus the frame counter may be cleared for frame synchronization.

Since each frame is made up of 14 segments, the clock selector 31 is controlled so that a window is opened every 14 segments. If continuous recognition as an address mark is possible, frame synchronization is judged to be locked. Upon frame synchronization, the address recording position can be recognized, so that the track address and the frame code are decoded by an address decoder (ADEC) 33. With the ADEC 33, the pattern of four bits coded in a Gray code is decoded by checking the coincidence with the Gray code table shown in FIGS. 5C and 6. The ADEC 33 samples the playback RF signals at positions a, b, c and d shown in FIG. 5C and finds the maximum amplitude position by a differential detection method. Similarly, the playback RF signals are sampled at respective positions e, f, g and h shown in FIG. 5C and the maximum amplitude position is found in order to effect decoding by the combination and the Gray code table. By the above process, the track address [AM] to [AL], parity [P], and the frame address [FM] and [FL] are decoded and the decoded results are stored in a register (not shown).

When the data is established, the DSP 47 reads out the register for detecting the current position of the pickup 9. Since it is not the four bits but the entire pattern that is coded in Gray code, a comparison with an inverted table or a non-inverted table is executed depending upon whether the LSB of the upper four bits is [1] or[0]. If, when the initially decoded frame code is loaded in a frame counter, and a number obtained on incrementing the frame counter on the frame basis is compared to the actually reproduced frame code, continuous coincidence is confirmed, rotation synchronization is deemed to be established. By returning the number obtained from the frame counter as the frame code to the DSP 47, there is no risk of a mistaken recognition of the frame position despite some defects.

The ADEC 33 decodes the GCP information in a similar manner to the track address and the frame code. However, the contents of the register are read out based on the GCP segment GCPseg having the GCP information recorded thereon instead of on the address segment. Thus the contents of the GCP area ARgcp may be confirmed.

The DSP 47 calculates the speed of movement of the pickup 9 as it reads the Gray coded track address for controlling the slide motor via a slide driver of the pickup driver 44 from the PWM circuit 45 for shifting the pickup 9 to a target track. When the pickup 9 reaches the target track, the tracking operation is executed. The tracking error signal TE is obtained by taking a difference of the amplitudes of RF signals reproduced from wobbling pits in the servo area. The DSP 47 feeds back the tracking control data resulting from digitally filtering the difference value to the galvano-driver and the slide driver of the pickup driver 44 via the PWM circuit 45 for constituting a tracking controlling servo loop. The slide motor is driven by the slide driver for controlling variations in low-frequency components and the galvano-motor of the pickup 9 is driven by the galvano-driver for effecting tracking control so that the laser spot will be at the track center.

The leading position of the target sector is detected under such a tracking state. The sector mark is present in a segment at the leading end of the sector and a segment directly preceding the segment. The respective sector marks control the clock selector 31 for opening the windows at the four positions A, B, C and D shown in FIG. 4. If the maximum amplitude position among the RF signals sampled at these four positions A to D is B, it specifies that the segment is the leading end segment of the sector, whereas, if the maximum amplitude position is C, it specifies that the segment is the segment directly previous to the sector. Basically, the segment at the leading end of the sector is determined by converting the sector address given by the host computer 3 into a physical sector and finding in which segment of which track the sector is located. The probability of the two kinds of sector marks becoming simultaneously defective is empirically not higher than $10^{-10}$, such that the probability of occurrence of defective sectors is extremely small.

The data clock generating circuit (DPLL) 30 generates data clocks dclk obtained on multiplying the flame-synchronized servo clocks sclk obtained from the SPLL circuit 29 by M/N and sends the data clocks dclk to a timing generator (DTG) 35 and the recording/reproducing circuit 36.

The recording/reproducing circuit 36 is fed during the recording mode with recording data via the controller 21 from the host computer 3. The recording/reproducing circuit 36 adds random numbers of e.g., 127 periods to the recording data by exclusive OR (EXOR) for carrying out sector-based scrambling in accordance with $Y=X^7+X+1$ and modulates the scrambled recording data into NRZI data synchronized with the data clocks dclk. The initial value is set to 1 for each segment. The modulated signal wdat is fed via the magnetic head driver 15 to the magnetic head 14, which then generates a magnetic field corresponding to the modulated signal wdat and applies the magnetic field to the data area ARd of the magneto-optical disc 5 superheated to the Curie temperature by the laser beam emitted by the laser diode 10 for recording the NRZI data.

During playback mode operation, the playback MO signal obtained by the IV conversion block 13 from the detected output by the photodetector 12 is converted into digital signals by the A/D converter 28, after being clamped to a suitable potential by the selector and clamp circuit 27, so as to be supplied to the recording/reproducing circuit 36. The recording/reproducing circuit 36 decodes the NRZI data by viterbi decoding after digitally filtering the playback MO signals digitized by the A/D converter 28 in conformity to partial response (1,1). The NRZI data is converted on the segment basis into the NRZ data which are descrambled on the sector basis into playback data which is transmitted via the controller 21 to the host computer 3.

By scrambling recording data in this manner, the data pattern is randomized so that the probability of the continuation of paths that cannot be established at the time of viterbi decoding is small while the memory capacity may be reduced. In addition, since the bit array is randomized for the ROM disc, the bit presence/absence ratio on the disc approaches 50% thus facilitating disc molding.

When instructed by the host computer 3 via the controller 21 to start recording or reproduction, the DSP 47 enters into a focus search mode of effecting tentative focusing on the disc surface prior to recording or reproduction. In the focus search mode, the DSP 47 operates in accordance with the flow chart shown in FIG. 15. That is, the present flow chart is programmed by software and starts when the main power source of the recording/reproducing apparatus for the magneto-optical disc is turned on to proceed to step S1.

At step S1, the STG 32 discerns whether or not a start of recording or reproduction is specified by the host computer 3 by determining if a drive-on-command signal has been received. If the result is NO, the DSP 47 repeats the step S1 and, if the result is YES, the DSP transfers to step S2 where the DSP 47 controls the laser driver 11 to fire the laser diode 10. The DSP then transfers to step S3.

Figure 3:
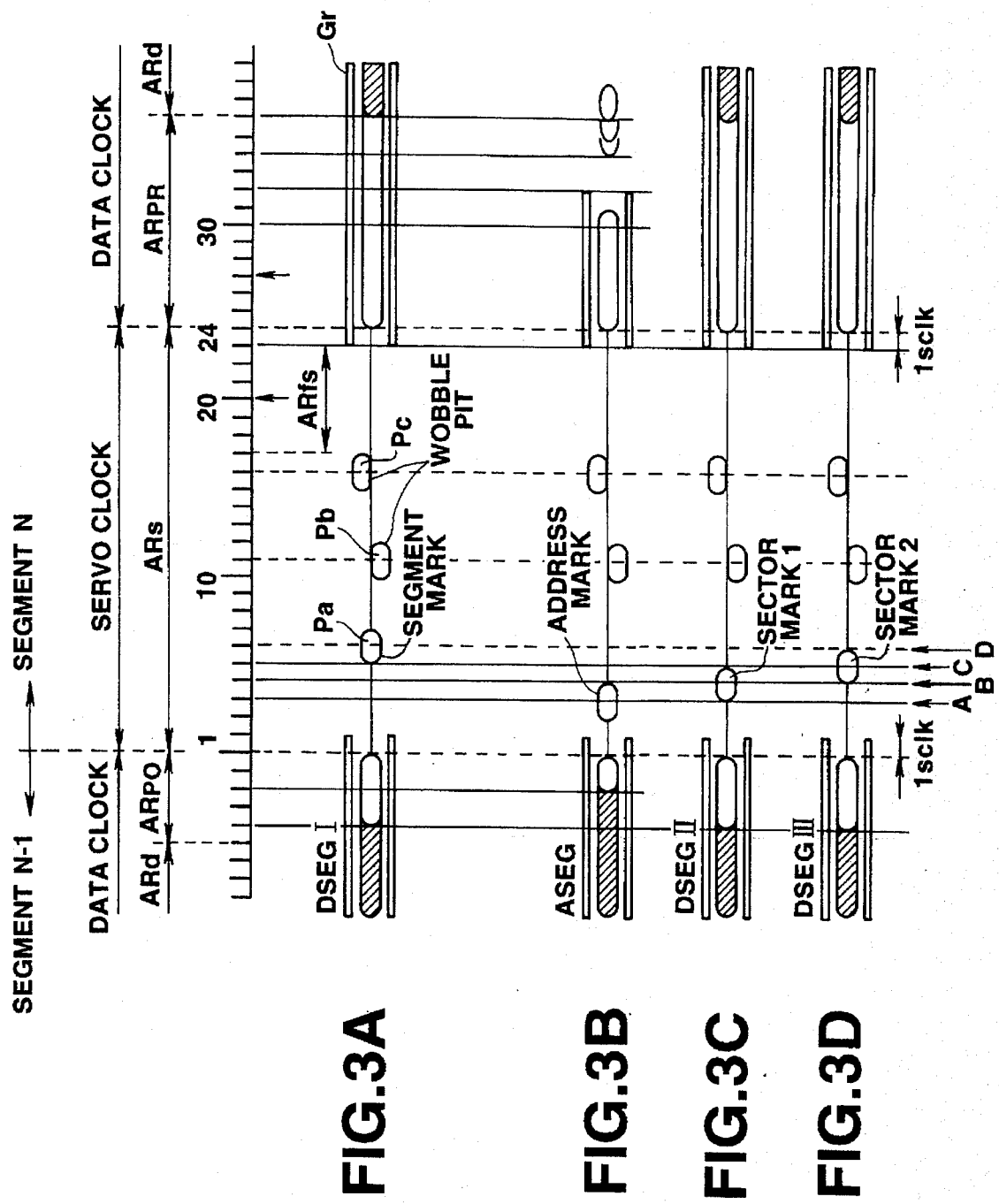
FIGS. 3A–3D are diagrams for explaining a format of a servo area of the magneto-optical disc.
Figure 4:
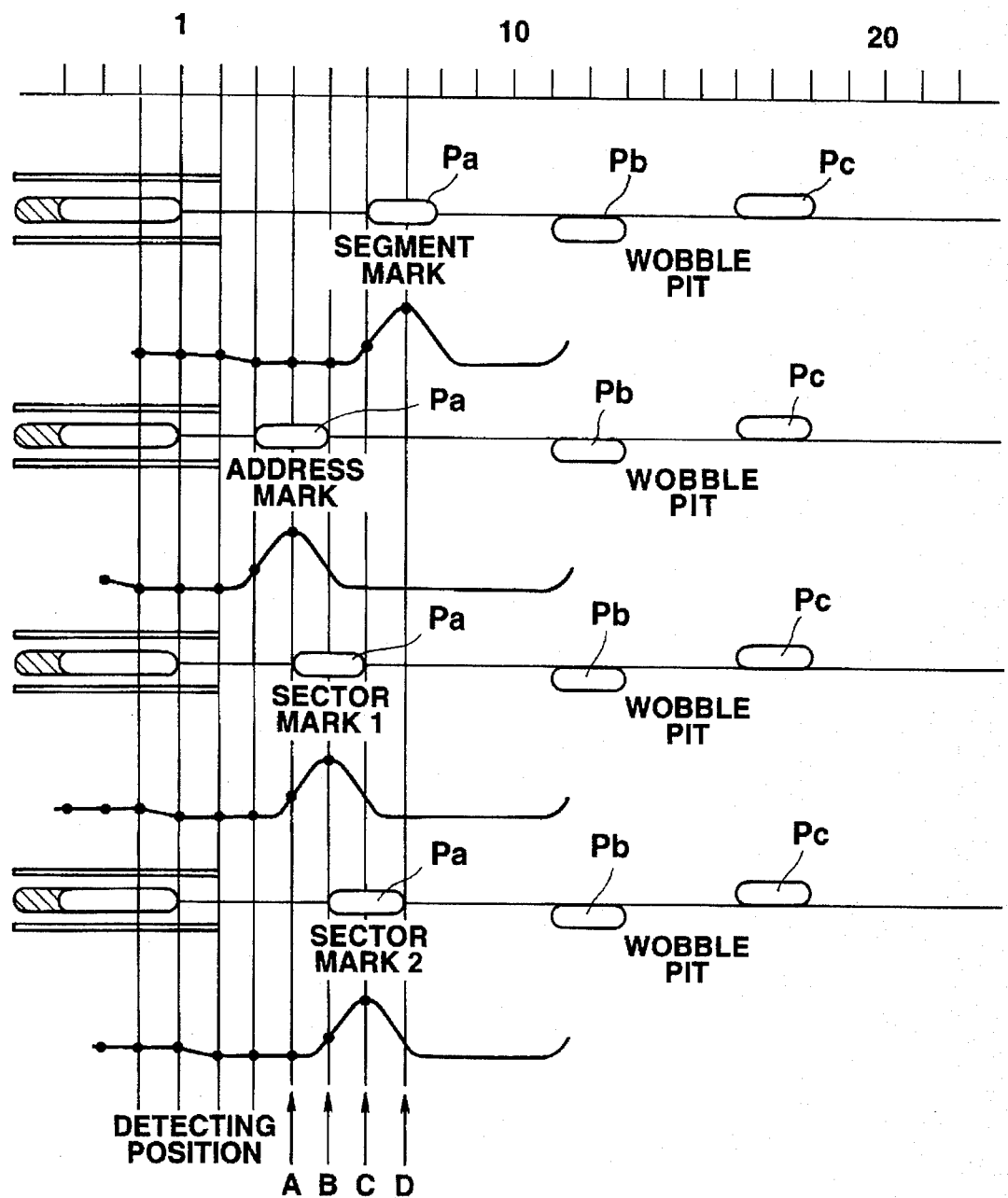
FIG. 4 illustrates how the first pit in the servo area of the magneto-optical disc is detected.

At step S3, the DSP 47 actuates only the focusing servo. The fixed clocks, which are clocks for the fixed frequency during focus search, are selected and sent to the D/A converter 42 and to the counter 49. That is, with the recording/reproducing apparatus for the magneto-optical disc, the rpm of the magneto-optical disc 5 is 2400. At this time, the frequency of servo clocks formed by the SPLL circuit 29 based on playback signals (RF signals) having a servo pattern shown in FIG. 3 is 12.096 MHz.

Figure 16:
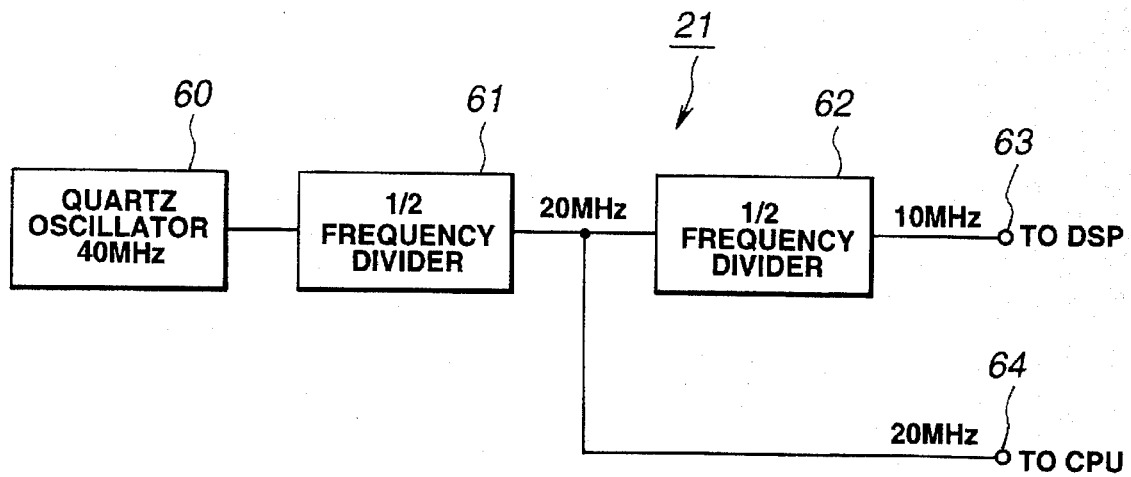
FIG. 16 is a block diagram of a quartz oscillator and a ½ frequency divider provided in a controller of the recording/reproducing apparatus for the magneto-optical disc.

As shown in FIG. 16, the controller 21 is provided with a quartz oscillator 60 outputting clocks of 40 MHz and two ½ frequency dividers 61, 62. The controller 21 divides the 40 MHz clocks from the quartz oscillator 60 by ½ by divider 61 and sends the resulting 20 MHz clocks via output terminal 64 to a CPU, not shown. The controller also divides the 20 MHz clocks by ½ by divider 62 to form 10 MHz clocks which are sent via output terminal 63 to the DSP 47.

Figure 17:
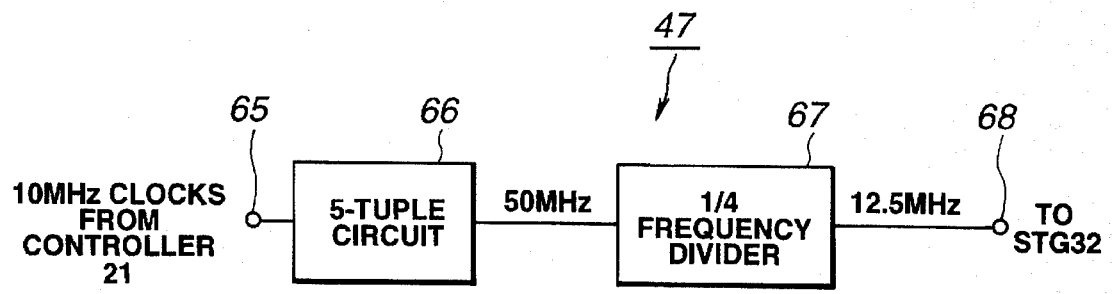
FIG. 17 is a block diagram of a 5-tuple circuit and a ¼ frequency divider provided in a DSP of the recording/reproducing apparatus for the magneto-optical disc.

The DSP 47 has a 5-tuple circuit 66 and a ¼ frequency divider 67 shown in FIG. 17. The DSP 47 converts the 10 MHz clocks supplied via input terminal 65 from the controller 21 into 50 Mhz clocks by the 5-tuple circuit 66 and frequency-divides the 50 MHz clocks by ¼ by the ¼ frequency divider 67 to generate fixed 12.5 MHz clocks close to the frequency (12.096 MHz) of the servo clocks. The 12.5 MHz clocks are sent via output terminal 68 to the STG 32.

Figure 18:
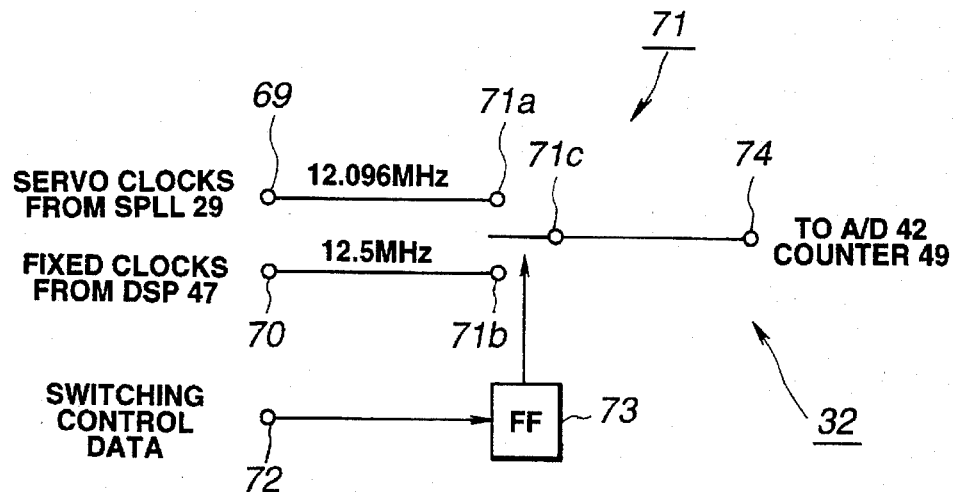
FIG. 18 is a block diagram of a changeover switch of fixed clocks from the DSP and servo clocks from an SPLL and which is provided in the STG of the recording/reproducing apparatus for the magneto-optical disc.

As shown in FIG. 18, the STG 32 has a changeover switch 71 and a flip-flop 73 for controlling the switching of the changeover switch 71. The changeover switch 71 has its input terminals 71a, 71b fed with servo clocks of 12.096 MHz from the SPLL circuit 29 via input terminal 69 and with the 12.5 MHz fixed clocks from the DSP 47 via input terminal 70, respectively.

During the focus search, the DSP 47 writes switching data "1", which is 1-bit switching data, in the flip-flop 73. If the focusing search is not performed solely, the DSP 47 writes switching data "0" in the flip-flop 73. The switching data written in the flip-flop 73 is supplied to the changeover switch 71. The changeover switch 71, fed with the switching data "1" or "0", controls a movable contact 71c to select either the input terminal 71b or the input terminal 71a, respectively. Thus, during the focusing search, the fixed clocks of 12.5 MHz are selected by the changeover switch 71 so as to be supplied via output terminal 74 to the A/D converter 42 and to the counter 49. If the focusing servo is not performed solely, the 12.096 MHz servo clocks are selected and supplied via output terminal 74 to the A/D converter 42, the DSP 47, and the counter 49.

Figure 19:
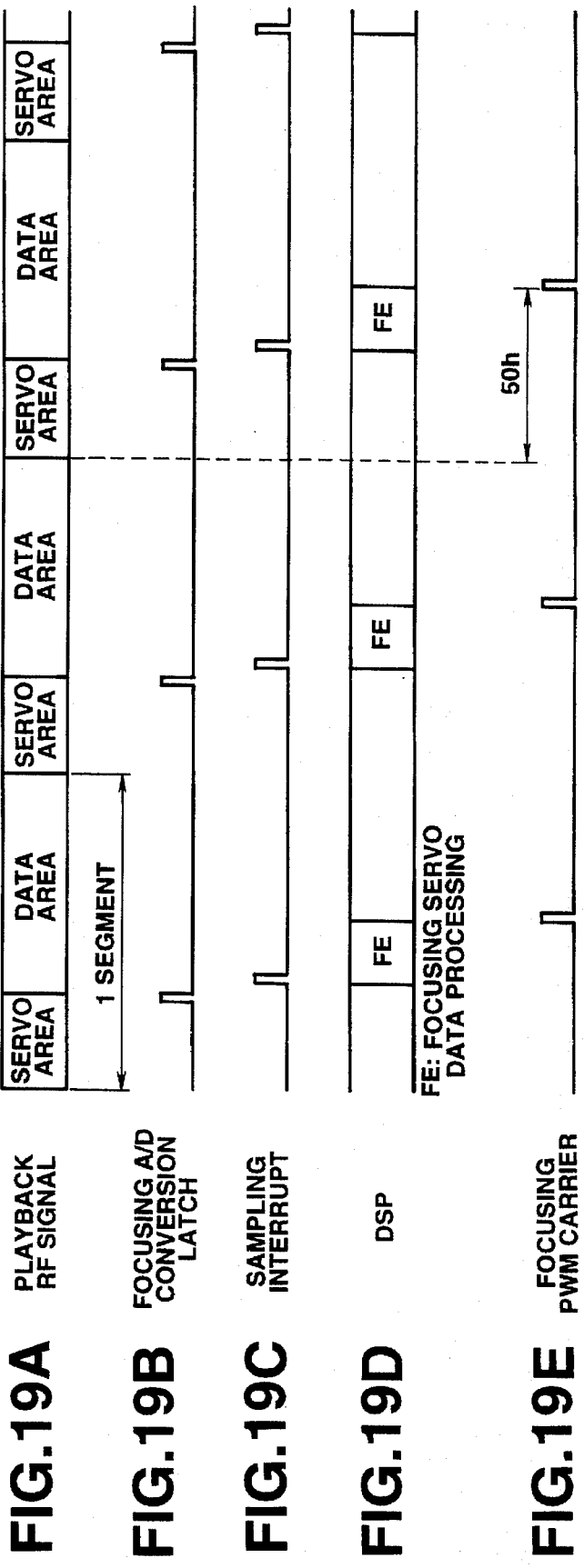
FIGS. 19(a) to 19(e) are timing charts for illustrating a focusing servo during focusing search and servo control of the recording/reproducing apparatus for the magneto-optical disc.

At step S3, the STG 32 switches in the manner described above, between fixed clocks and servo clocks during focus search before transferring to step S4. At step S4, the focus search is carried out, before the DSP transfers to step S5. That is, the A/D converter 42 is fed via multiplexor 41 with focusing error signals formed for each servo area, as shown in FIG. 19a, and fixed clocks of 12.5 MHz. The A/D converter 42 latches the focusing error signals, based on the fixed clocks, and digitizes the latched signals to send the digitized data as the focusing error signal via I/O block 43 to the DSP 47, as shown in FIG. 19b. The DSP 47 is fed with interrupt pulses from STG 32, as shown in FIG. 19c. The DSP 47 captures focusing error data based upon the interrupt pulses as shown in FIG. 19d and transmits the captured focusing error data to the PWM circuit 45.

When both the focusing servo and the tracking servo are performed, the DSP 47 sets "A0h" (hexadecimal number for 160) in the focusing timing control register 48, as will be explained subsequently. During focus search or seek, the DSP sets "50h" (hexadecimal number for 80) in the focusing timing control register 48. The counter 49 counts the number of the fixed clocks from the STG 32 during focus search.

The comparator 50 compares the setting value of the focusing timing control register 48 to the count value of the counter 49 and sends output timing control data shown in FIG. 19e to the PWM circuit 45 at a timing when the count value of the counter 49 is equal to a setting value "50h" of the focusing timing control register 48, that is at a timing when the count value becomes equal to 80. The PWM circuit 45 outputs the focusing error data supplied from the DSP 47 each time the output timing data is supplied.

Consequently, during the focus search, focusing error data is outputted from the PWM circuit 45 at a timing substantially equal to one-half that when both focusing servo and tracking servo are performed. The focusing error data are supplied via the pickup driver 44 to the pickup 9. The pickup 9 vertically shifts an objective lens based upon focusing error data for tentative focusing.

Referring again to FIG. 15, at the next step S5, the DSP 47 judges, based upon focusing error data produced during the focus search, whether or not the laser beam is correctly focused on the surface of the magneto-optical disc 5. If the result is YES, the DSP transfers to step S6 and if otherwise to step S9. At step S9, it is judged whether or not a pre-set time has elapsed since the start of focus search, that is whether a time-out has occurred. If the result is NO, the DSP repeats the routine of steps S5 and S9. If the result is YES, the DSP deems that some trouble has occurred and directly terminates the routine shown in the flow chart of FIG. 15.

At step S6, the DSP 47 judges whether or not the PLL circuit for the focusing servo is locked. If the result is YES, the DSP transfers to step S7 and if the result is NO, the DSP transfers to step S10. At step S10, it is judged whether or not a pre-set time has elapsed since the start of the focusing lock, that is whether a time-out has occurred. If the result is NO, the DSP repeats the routine of steps S6 and S10. If the result is YES, the DSP deems that some trouble has occurred and directly terminates the routine shown in the flow chart of FIG. 15.

At step S7, since the focusing servo capturing is terminated, the DSP 47 changes the switching data of flip-flop 73 of FIG. 18 from "1" to "0" before transferring to step S8. Thus the input terminal 71a of the changeover switch 71 is selected by its movable contact 71c and the 12.096 MHz servo clocks from the SPLL 29 are fed via the changeover switch 71 to the A/D converter 42 and the counter 49. Focus servo is performed based upon focusing error data formed by the A/D converter 42 by the 12.096 MHz servo clocks.

Figure 15:
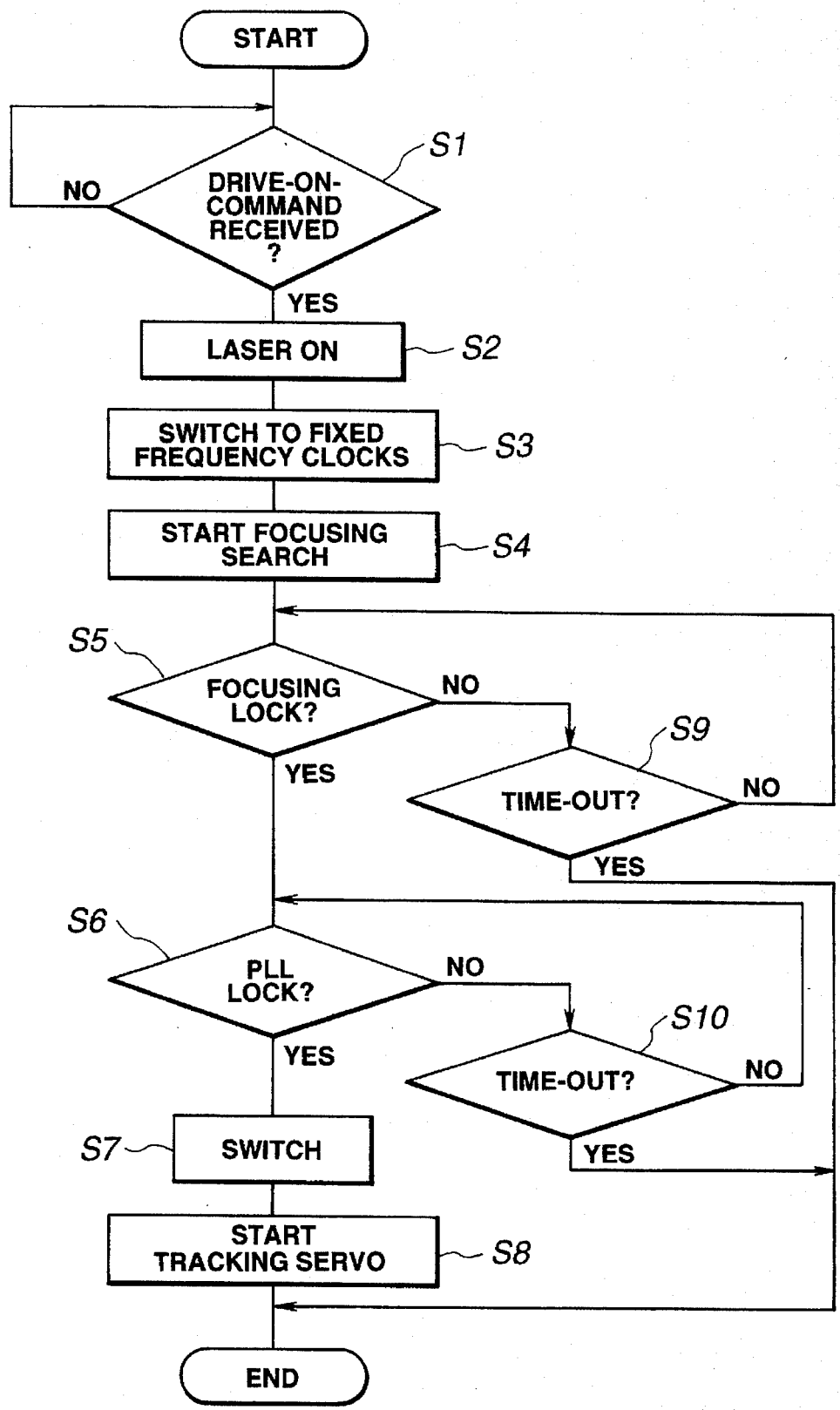
FIG. 15 is a flow chart for illustrating the operation during a focusing search of the recording/reproducing apparatus for the magneto-optical disc.

The DSP 47 starts the tracking servo at step S8 to terminate the entire routine of focus search shown in FIG. 15. When the focus servo comes to a close, the recording/ reproducing apparatus for the magneto-optical disc enters into the normal servo control mode of simultaneously applying, the focusing servo and tracking servo.

In the normal servo control state, the DSP 47 sets "A0h", a hexadecimal number for 160, in the focus timing controlling register 48, while setting "80h", a hexadecimal number for 128, in a tracking error timing control register, not shown. A laser beam is radiated on the magneto-optical disc 5 for reproducing the servo area and the data area in this order as shown in FIG. 21a, so that the focusing error signal and the tracking error signals are sent via multiplexor 41 to the A/D converter 42, as described above. The A/D converter 42 digitizes the focusing error signals and the tracking error signals, based upon servo clocks supplied from the SPLL circuit 29 (via the STG 32), in order to output the focusing error and tracking error.

For improving tracking servo response characteristics, the DSP 47 captures tracking error data by tracking error latch pulses supplied from STG 32 as shown in FIG. 21b, prior to engaging focusing error data, and then captures focusing error data by a focusing error latch pulse shown in FIG. 21c. The DSP 47 effects phase compensation on the focusing error and tracking error signals in this order as shown in FIG. 21e based upon sampling interrupt pulses supplied from STG 32 as shown in FIG. 21d and transmits the resulting data to the PWM circuit 45.

Specifically, the rpm of the disc in the recording/ reproducing apparatus for the magneto-optical disc is 2400, while the frequency of servo clocks from the SPLL circuit 29 is 12.096 MHz. On the other hand, each segment is of a period 216 times that of the servo clocks, so that the sampling clocks for the focus error signals employed in the A/D converter 42 are 56 kHz. The filter coefficients for phase compensation are pre-calculated based upon this frequency and stored in a memory provided in the DSP 47. Thus, when engaging the focusing error and tracking error signals, the DSP 47 phase-compensates the error data based upon the filter coefficients stored in the memory and transmits the resulting data to the PWM circuit 45.

The counter 49 is fed with servo clocks from the SPLL circuit 29 and sends the count value to the comparator 50. The value "80h", set in the tracking timing control register, is fed to the comparator 50. When the count value from the counter 49 is "80h", that is when the count value is 128, the comparator 50 sends output timing data to the PWM circuit 45, which outputs the tracking error at a timing when the output timing data is supplied thereto. This causes the PWM circuit 45 to output tracking error as shown in FIG. 21f.

The value "80h", set in the tracking timing control register during normal servo control, is fed to the comparator 50. When the count value from the counter 49 is "A0h", that is when the count value is 160, the comparator 50 sends output timing data to the PWM circuit 45, which outputs the focusing error at a timing when the output timing data is supplied thereto. This causes the PWM circuit 45 to output the tracking error data as shown in FIG. 21g.

The tracking error data and the focusing error data are fed to the pickup driver 44. The pickup driver 44 drives the pickup 9 in a direction of correcting the tracking error and the focusing error specified by the tracking error data and the focusing error data. This enables the recording data to be correctly reproduced at all times in the just-tracking state and in the just-focusing state.

Figure 20:
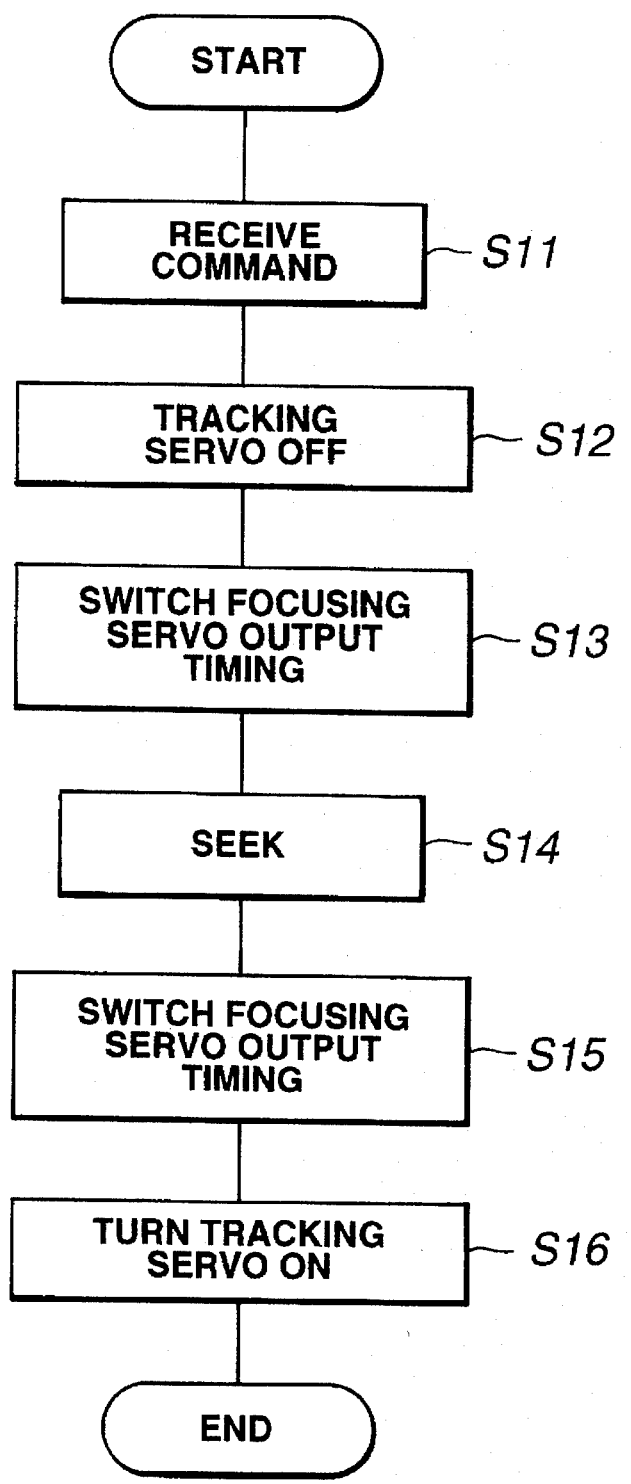
FIG. 20 is a flow chart for illustrating the operation of the recording/reproducing apparatus for the magneto-optical disc during seek.

Referring to the flow chart of FIG. 20, the operation of the recording/reproducing apparatus for the magneto-optical disc during seek is explained. With the flow chart shown in FIG. 20, the program is started when the man power source of the recording/reproducing apparatus for the magneto-optical disc is turned on, and transfers to step S11. At step S11, the controller 21 sends a seek command received from the host computer 3 to the DSP 47. The DSP 47 then transfers to step S12.

Since the seek is specified at step S12, the DSP 47 sets the PLL circuit for the tracking servo to the state of an open loop. Since the focusing servo is executed alone, the DSP 47 sets "50h" in the focusing timing control register 48 at step S14. At step S14, the DSP 47 causes the pickup 9 to be moved via the PWM circuit 45 and the pickup driver 44 and executes seek as far as the target track. The DSP then transfers to step S15.

At step S15, the DSP executes the focusing servo capture at a timing of "50h" as set in the focusing timing control register 48, as explained above. When seek is completed, the DSP 47 then transfers to step S16. At step S16, the DSP 47 sets the PLL circuit for tracking servo to the state of Closed loop to terminate the entire routine of the flow chart shown in FIG. 20. On termination of the seek operation, the DSP 47 sets "80h" and "A0h" in the tracking timing control register and in the focusing timing control register 48 as explained above for executing servo control comprised of both the tracking servo and the focusing servo.

It will be clear from the foregoing that, with the MO recording/reproducing apparatus of the present invention, since the respective parts are controlled so that the focusing error data will be outputted earlier than with the usual timing when the focusing servo is carried out by itself, such as during focus search or seek, it becomes possible to reduce the time duration between latching of the focusing error signals from the A/D converter 42 until outputting thereof via the PWM circuit 45. The result is that phase allowance of the servo loop may be improved and the focusing servo which tends to become unstable during focusing search and seek may be stabilized for shortening the time required until the start of recording or reproduction. When the focus searching alone is carried out, the focusing servo is captured using fixed clocks of a fixed frequency and, once the focusing servo is captured, the fixed clocks are switched to usual servo clocks for carrying out the focusing servo.

Ordinarily, if the PLL for carrying out focusing servo is in the free-running state, the frequency of the servo clocks outputted by a voltage controlled oscillator (VCO) is fluctuated by approximately "30%. It takes a time of from several msec to tens of msec after focusing servo is captured until the PLL is locked. If a closed loop is established by capturing the focusing servo in this state and the focusing servo is performed for phase compensation, there is produced an error in the sampling frequency due to clock variation, such that filter coefficients for phase compensation become incorrect and phase compensation becomes unfeasible. In particular, the focusing actuator amplitude is large directly after capture of the focusing servo so that the servo state tends to become unstable and hence the focusing servo, once captured, becomes disengaged due to troubles in phase compensation. However, by employing fixed clocks of the fixed frequency during the focusing servo engagement as in the present recording/reproducing apparatus for the magneto-optical disc, phase compensation directly following the focusing servo engagement may be rendered more correct for realizing stable the focusing servo.

The fixed clocks are of 12.5 MHz which is slightly different from 12.096 MHz of commonly employed servo clock frequency. However, the fixed clocks are free from frequency variations as compared to the free-running servo clocks so that the above effect may be achieved without any inconveniences. The fixed clocks of 12.5 MHz are formed by frequency division of 40 MHz from the quartz oscillator 60 shown in FIG. 16. Although plural oscillators provided within the equipment might lead to increased cost and the problem of noise, these problems are avoided in the recording/reproducing apparatus of the present invention by employing only one quartz oscillator 60. Thus, noise is prohibited from being produced while the cost is lowered.

The phase compensation is executed when tracking servo and focusing servo are used in combination. However, it is also possible to provide filter coefficients for fixed clocks in advance and store them in the memory of the DSP 47 and to effect phase compensation of the fixed clocks using the filter coefficients of the fixed clocks during focusing search or seek (the filter coefficients are switched between combined use of tracking servo and focusing servo and use only of focusing servo). This renders phase compensation of fixed clocks or servo clocks performed by the DSP 47 more correct and allows achievement of a more stabilized focusing servo.

In the above description of the preferred embodiment, the output timings of the tracking error data and the focusing error data during normal recording and reproduction are set to 80h and A0h, respectively, while the output timing of the focusing error data in case the focusing servo is effected by itself is 50h. However, any optional output timing may be used depending on design conditions. However, the output timing of the focusing error data in the case that the focusing servo is executed by itself should be set in consideration that, if the focusing error data are outputted too promptly, there is insufficient allowance in data processing in the DSP 47.

Although the focusing servo signal control apparatus according to the present invention is applied in the above description to a recording/reproducing apparatus for a magneto-optical disc, it may be applied to any other reproducing apparatus, recording apparatus or recording/reproducing apparatus for an optical disc, such as a compact disc or a write-once disc, provided that the apparatus operates on the sample servo system.

It is possible with the servo signal processing apparatus of the present invention to improve phase allowance of the focusing servo loop when the focusing servo loop is in operation by itself during engagement of focusing or seek. The result is that stable focusing servo may be realized while the time required for engagement of the focusing servo may be shortened. Thus the time required for recording or reproduction may be shortened if the servo signal processing apparatus is provided in the reproducing apparatus, recording apparatus or recording/reproducing apparatus for an optical disc.

It is further possible with the focusing servo control device of the present invention to assure correct phase compensation directly after the focusing servo engagement to realize stable focusing servo. On the other hand, since fixed clocks are formed by e.g., frequency division of system clocks of the pre-set frequency from the oscillating means for system clocks, the oscillating means for system clocks may be simultaneously used as oscillating means for fixed clocks. The result is that it becomes possible to prohibit errors caused by provision of plural high-frequency oscillating means, while the focusing servo control device may be lowered in cost through reducing the number of components and simplifying the construction.

Although the present invention has been shown and described with respect to the preferred embodiments, various changes and modifications may be made within the technical concept of the present invention and are deemed to lie within the spirit and scope of the invention as claimed.

What is claimed is:

1. An apparatus for reproducing signals recorded on an optical disc having a plurality of equal angular servo areas each having servo patterns for providing control of tracking, focusing and clocks, the apparatus comprising:

drive means for rotating the optical disc and including an optical pickup for tracing a track formed on the optical disc, the drive means reproducing signals from the rotating optical disc;

servo clock generating means for deriving servo clocks from the reproduced signals output by the drive means;

servo control means for controlling the focusing and tracking of the optical pickup based upon the servo clocks supplied therewith so as to establish a focusing servo and a tracking servo;

fixed clock generating means for producing fixed clocks so that the servo control means performs a focusing search based upon the fixed clocks;

switching means for selectively supplying either the servo clocks or the fixed clocks to the servo control means; and switching control means for controlling the switching means so that the fixed clocks, as a substitute for the servo clocks, are supplied to the servo control means in the focusing search, and for controlling the switching means so that the servo clocks are supplied to the servo control means after engagement of the focusing servo.

2. The apparatus of claim 1, further comprising analog to digital conversion means for converting analog reproduced signals corresponding to the servo pattern into digital signals; and wherein the servo clock generating means compares the digital signals to a pre-stored servo pattern and predicts a next timing of coincidence between the digital signals and the pre-stored servo pattern based on a timing when the digital signals and the pre-stored servo pattern have been coincident.

3. The apparatus of claim 2, wherein the servo clock generating means captures the digital signals and again compares newly captured digital signals of the servo pattern to the pre-stored servo pattern.

4. The apparatus for claim 3, wherein the servo clock generating means regards a synchronization of the reproduced signals from the optical disc is in a locked state when a coincidence between the digital signals and the pre-stored servo pattern has been continuously detected a predetermined number of times.

5. The apparatus of claim 1, wherein the fixed clock generating means includes oscillating means for producing system clocks having a predetermined frequency and frequency dividing means for dividing the system clocks so as to form the fixed clocks.

6. The apparatus of claim 1, wherein the servo pattern in each servo area includes a tracking portion used for the tracking control and a focusing portion used for the focusing control, the focusing portion following the tracking portion in the servo area.

7. The apparatus of claim 1, wherein the servo control means includes means for digitizing a focusing error signal and a tracking error signal supplied therewith from the drive means based on the servo clocks, and means for effecting phase compensation on the focusing error signals and the tracking error signals so as to output focusing error data and tracking error data in the order in which they are supplied, and pickup driving means for driving the optical pickup in a direction of correcting tracking error and focusing error specified respectively by the tracking error data and focusing error data at a timing corresponding to the tracking control and the focusing control.

8. The apparatus of claim 7, further comprising timing control means for controlling the output timing of the focusing error data so that, when the focusing control is effected by itself, the output timing is prompted at a predetermined time in order to supply only the focusing error data to the pickup driving means.

9. The apparatus of claim 8, wherein the timing control means controls the output timing of the focusing error data during the focusing search for focusing on the surface of the optical disc in the case of effecting the focusing control by itself.

10. The apparatus of claim 9, wherein, when the focusing search comes to a close, the timing control means controls the output timing of the focusing error data so as to succeed the output timing of the tracking error data.

11. The apparatus of claim 8, wherein the timing control means controls the output timing of the focusing error data during a seek operation in which the optical pickup is moved to a desired track radially in relation to the optical disc by the pickup driving means.

12. The apparatus of claim 11, wherein, when the seek comes to a close, the timing control means controls the output timing of the focusing error data so as to succeed the output timing of the tracking error data.

13. In a recording/reproducing apparatus for recording/reproducing an optical disc, a focusing servo operation controlling device of a phase-locked loop configuration in which a focusing servo operation is effected based upon focusing servo clocks formed by a playback output of pre-set servo patterns from the optical disc on which the servo patterns are arrayed at pre-set intervals, comprising:

fixed clock outputting means for outputting fixed clocks for a focusing servo operation of a fixed frequency;

switching means for switching between outputting the focusing servo clocks or the fixed clocks; and control means for effecting switching control of the switching means for selecting and outputting the fixed clocks when effecting the focusing servo operation alone and selecting and outputting the focusing servo clocks directly after engagement of the focusing servo operation.

14. The apparatus as claimed in claim 13 further comprising:

analog to digital conversion means for analog to digital converting the playback output of the servo pattern; and comparator means for comparing playback data of the servo patterns from the analog to digital converting means to a pre-stored servo pattern, predicting a next timing of coincidence between the playback data of the servo pattern and the pre-stored servo pattern based upon a timing when the playback data and the pre-stored servo pattern has been coincident, capturing the playback data of the servo pattern and again comparing newly captured playback data of the servo pattern to the pre-stored servo pattern, the above sequence being repeated a pre-set number of times;

the phase locked loop configuration being such that a phase lock with respect to the surface of the optical disc is deemed to be achieved when the coincidence has been continuously detected a pre-set number of times by the comparator means.

15. The apparatus as claimed in claim 13 wherein the fixed clock outputting means includes oscillating means for outputting system clocks of a pre-set frequency and frequency dividing means for frequency dividing the system clocks from the oscillating means for forming the fixed clocks.

16. The apparatus as claimed in claim 15 further comprising phase compensation means having a first filter coefficient for fixed clocks and a second filter coefficient for focusing servo clocks, the phase compensation means outputting the fixed clocks after phase compensation thereof with the first filter coefficient, the phase compensation means outputting the focusing servo clocks after phase compensation thereof with the second filter coefficient; and the control means effecting switching control of the switching means for selecting and outputting the fixed clocks, the control means controlling the phase compensation means for effecting phase compensation with the first filter coefficient, when effecting the focusing servo operation alone, the control means effecting switching control of the switching means for selecting and outputting the focusing servo clocks, the control means controlling the phase compensation means for effecting phase compensation with the second filter coefficient, after engagement of the focusing servo operation.

* * * * *